(12) United States Patent
Tokuda

(10) Patent No.: US 11,314,469 B2
(45) Date of Patent: Apr. 26, 2022

(54) INFORMATION PROCESSING DEVICE AND CONTROL METHOD TO GENERATE A VIRTUAL DEVICE IN THE INFORMATION PROCESSING DEVICE

(71) Applicant: CANON KABUSHIKI KAISHA, Tokyo (JP)

(72) Inventor: Akihiko Tokuda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/890,846

(22) Filed: Jun. 2, 2020

(65) Prior Publication Data

US 2020/0387332 A1    Dec. 10, 2020

(30) Foreign Application Priority Data

Jun. 4, 2019   (JP) .............................. JP2019-104450

(51) Int. Cl.
*G06F 3/12*      (2006.01)
*G06F 9/455*     (2018.01)

(52) U.S. Cl.
CPC .......... *G06F 3/1231* (2013.01); *G06F 3/1204* (2013.01); *G06F 3/1209* (2013.01); *G06F 3/1236* (2013.01); *G06F 3/1255* (2013.01); *G06F 9/45558* (2013.01); *G06F 2009/45595* (2013.01)

(58) Field of Classification Search
CPC .... G06F 3/1231; G06F 3/1204; G06F 3/1209; G06F 3/1236; G06F 3/1255; G06F 9/4558; G06F 2009/45595

USPC ........................................................ 358/1.15
See application file for complete search history.

(56) References Cited

U.S. PATENT DOCUMENTS

| | | | |
|---|---|---|---|
| 9,606,758 B1* | 3/2017 | Chandler | G06F 3/1226 |
| 2008/0186532 A1* | 8/2008 | Ogasawara | G06F 3/1226 358/1.15 |
| 2012/0274979 A1* | 11/2012 | Uchida | G06F 3/1236 358/1.15 |
| 2014/0300914 A1* | 10/2014 | Yamazaki | G06F 3/1285 358/1.13 |
| 2017/0017448 A1* | 1/2017 | Hirata | G06F 3/1287 |
| 2017/0060488 A1* | 3/2017 | Oya | G06F 3/1224 |
| 2017/0109110 A1* | 4/2017 | Kitagata | G06F 3/1287 |

FOREIGN PATENT DOCUMENTS

| | | |
|---|---|---|
| JP | 2006113863 A | 4/2006 |
| JP | 2016110520 A | 6/2016 |

* cited by examiner

*Primary Examiner* — Allen H Nguyen
(74) *Attorney, Agent, or Firm* — Canon U.S.A., Inc. IP Division

(57) ABSTRACT

A virtual printer service according to the present disclosure acquires a response to a device search request from an actual printer and a virtual printer, determines based on the acquired response whether or not each device that has responded to the device search request is a virtual device, and presents, to a user, information on one or more devices in which a device determined as the virtual printer is excluded from the plurality of devices that have responded. A virtual device that transmits a print job to one device is then created based on information on the one device selected by the user from the presented information on one or more devices.

13 Claims, 19 Drawing Sheets

FIG. 17A

| Name | Type |
|---|---|
| Printer AY | Network |
| Printer BZ | Network |
| Printer A | Network |

Name : Printer AY

Place : Main building, 3F

[Add]

FIG. 17B

| Name | Type |
|---|---|
| Printer AY | Network |
| Printer BZ | Network |

Name : Printer AY

Place : Main building, 3F

[Add]

INFORMATION PROCESSING DEVICE AND CONTROL METHOD TO GENERATE A VIRTUAL DEVICE IN THE INFORMATION PROCESSING DEVICE

BACKGROUND OF THE INVENTION

Field of the Invention

The present disclosure relates to control of an information processing device that generates a virtual device in the information processing device having an operating system.

Description of the Related Art

When peripheral equipment such as an image forming device is used from an information processing device, in general, a particular device driver supported by the peripheral equipment is installed in operating system (hereafter, referred to as "OS") operating on the information processing device. That is, in a case of an image forming device, a printer driver is installed to utilize the image forming device.

On the other hand, in recent years, print systems that enable printing without using a printer driver by using a particular protocol have been introduced in OS. For example, print systems supported by AirPrint (registered trademark) by Apple, Inc., Android (registered trademark) by Google LLC, Mopria (registered trademark) of Windows (registered trademark) by Microsoft Corp., or the like have been introduced. In such a case, a printer driver supported by the image forming device is not required to be installed in the OS, generation of a print job and transmission of the print job to the image forming device are all performed by the OS (see Japanese Patent Application Laid-Open No. 2016-110520). Note that the AirPrint is a function of a part of the OS.

However, an image forming device not supported by a print system that enables printing without using a printer driver is unable to interpret a print job when receiving the print job from the OS. Accordingly, we are seeking to create a virtual image forming device (hereafter, referred to as "virtual device") that can receive a print job from the OS within an information processing device and cause the virtual device to transmit the received print job to the image forming device. To this end, such a virtual device is required to be found by the OS. Thus, we are seeking to provide a function responding to searching from the OS in a virtual device in the same manner as the actual image forming device.

Note that a virtual device is required to be associated with an image forming device to which a print job is transmitted (hereafter, referred to as "connection target"). Accordingly, we are seeking a configuration that searches a network for an image forming device when creating a virtual device and allows a user to select an image forming device that serves as a connection target of a virtual device out of found image forming devices.

However, a virtual device that responds to searching from the OS will also respond to searching when creating a virtual device, as described above. Thus, a virtual device may be selected as a connection target by a user, and a virtual device associated with a virtual device as a connection target may be created. Such a virtual device associated with a virtual device as a connection target is unable to perform printing in a state where a host computer in which a virtual device of a connection target resides is not started up, for example. It is therefore desirable to prevent a virtual device associated with a virtual device from being created and enable appropriate creation of a virtual device.

SUMMARY OF THE INVENTION

The present disclosure includes, an acquisition unit that acquires a response to a device search request from an image forming device configured to form an image on a sheet and a virtual device on an information processing device configured to transmit a print job to the image forming device, a determination unit that determines based on the acquired response whether or not each device that has responded to the device search request is the virtual device, and a presentation unit that presents, to a user, information on one or more devices in which a device determined as the virtual device is excluded from a plurality of devices that have responded.

Further features of the present disclosure will become apparent from the following description of exemplary embodiments with reference to the attached drawings.

BRIEF DESCRIPTION OF THE DRAWINGS

FIG. 17A is a diagram illustrating an example of a target printer list.

FIG. 17B is a diagram illustrating another example of a target printer list.

DESCRIPTION OF THE EMBODIMENTS

First Embodiment

Figure 1:
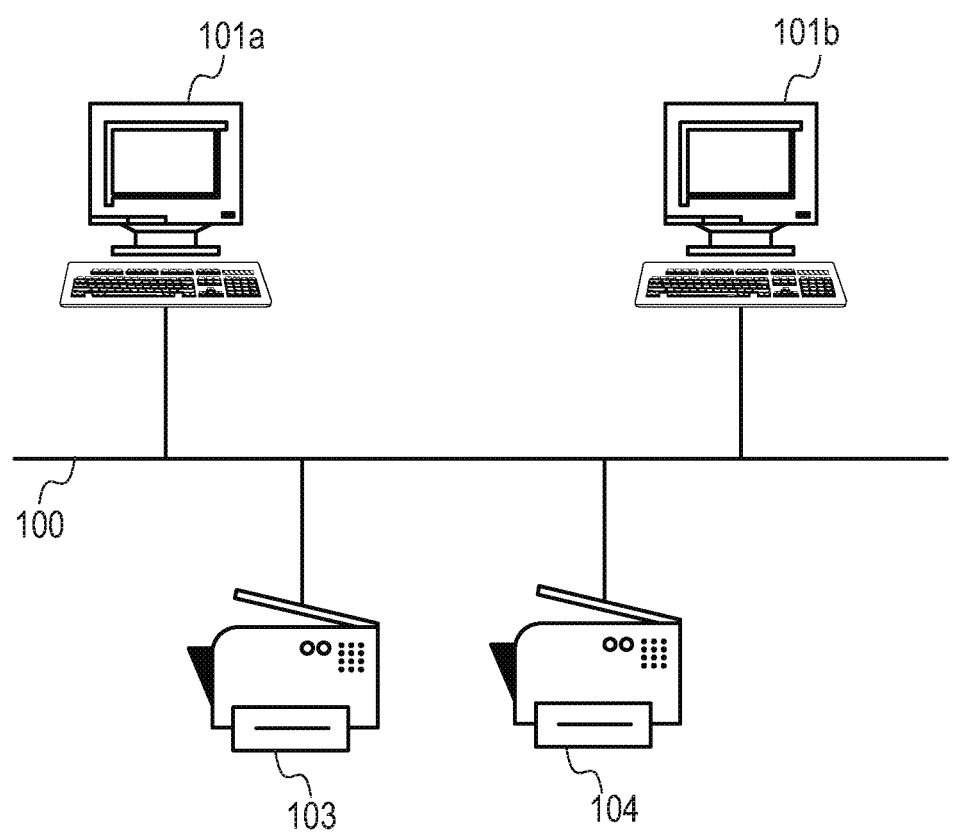
FIG. 1 is a diagram illustrating an example of a general configuration of a print system of the embodiments.

FIG. 1 is a diagram illustrating an example of a general configuration of a print system representing one embodiment of the present disclosure.

The system according to the present embodiment has host computers 101a and 101b and printers 103 and 104. Each of the host computers 101a and 101b is an example of an information processing device such as a personal computer (PC) or the like. Each of the printers 103 and 104 is an image forming device that receives print data in a page description language (hereafter, referred to as "PDL") format or a raster format and performs printing.

These devices can communicate with each other via a network 100. The network 100 may be a local area network (LAN) or an intranet, for example, and may include a wide area network (WAN).

Note that each of the printers 103 and 104 may be a single-function printer having only a printing function or may be a multifunction printer having a printing function, a scanning function, and a copying function. Further, one or three or more host computers or one or three or more printers may be connected to the network 100.

Note that, in the following description, the index "a", "b", or the like may be omitted to simply denote the host computer 101 when description common to the host computers 101a and 101b is provided. Further, the index "a" or "b" may also be omitted to describe each component thereof.

Figure 2:
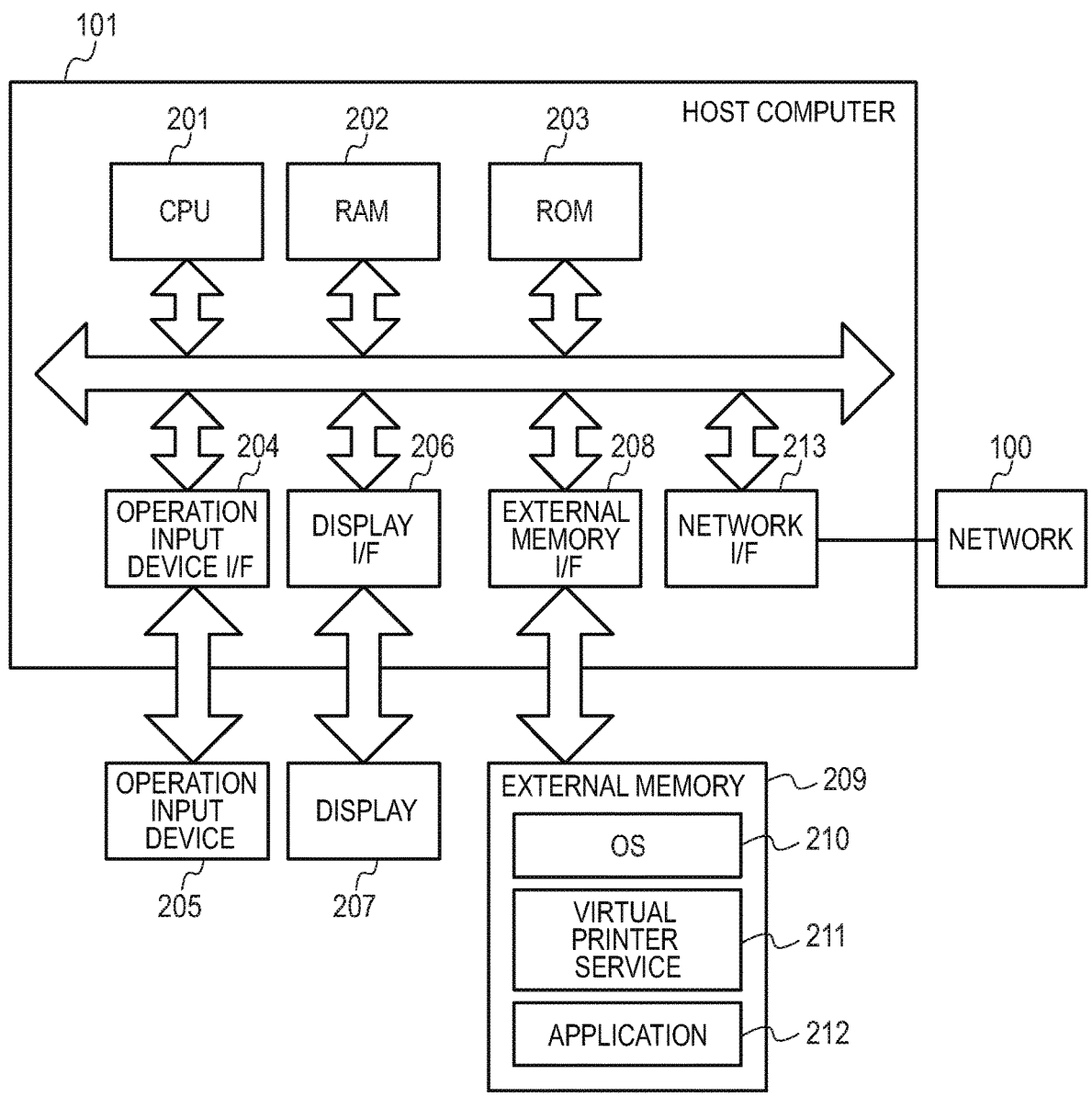
FIG. 2 is a hardware configuration diagram of an information processing device that can configure a host computer.

FIG. 2 is a diagram illustrating an example of a hardware configuration of an information processing device that can configure the host computer 101. A control unit including a CPU 201 controls the overall operation of the host computer 101. The CPU 201 loads a program stored in a ROM 203 or an external memory 209 to a RAM 202 and executes the program to perform various control such as control of a user interface (hereafter, referred to as "UI") window, generation of print data, transfer of print data, or the like.

The RAM 202 is a primary storage memory of the CPU 201 and is used as a work area or a temporary storage region used for loading various programs thereto. The ROM 203 stores a control program, a boot program, or the like that can be executed by the CPU 201. The external memory I/F 208 is an interface that connects the external memory 209 to the control unit. The external memory 209 stores operating system (OS) 210, a virtual printer service 211, an application 212, and the like.

While an auxiliary storage device such as a hard disk drive (HDD) is assumed as the external memory 209 in the present embodiment, a nonvolatile memory such as a solid state drive (SSD) may be used instead of or in addition to the HDD. In such a way, the hardware components such as the CPU 201, the RAM 202, the ROM 203, the external memory 209, and the like form a so-called computer.

An operation input device I/F 204 is an interface that controls an operation input device 205 such as a keyboard, a pointing device (mouse), a touch input device, or the like. The operation input device 205 functions as an accepting unit that accepts an operation from a user. A display I/F 206 controls display of a window on a display 207. The display 207 functions as a display unit that displays information to the user.

The host computer 101 is connected to the network 100 via a network I/F 213. The network I/F 213 performs transmission of print data to the printer 103 or 104 on the network 100, communication via the Internet, or the like. Note that data communication with an external terminal on the network 100 may be wireless communication complying with the IEEE 802.11 series or communication via a wired cable such as a LAN cable, for example.

Note that the OS 210, a virtual printer service 211 described later, various applications 212, and the like have been installed in the external memory 209 of the host computer of the present embodiment. Each software functions when a program stored in the ROM 203 or the external memory 209 is loaded to the RAM 202 and executed by the CPU 201 and implements the function of software described below.

Figure 3:
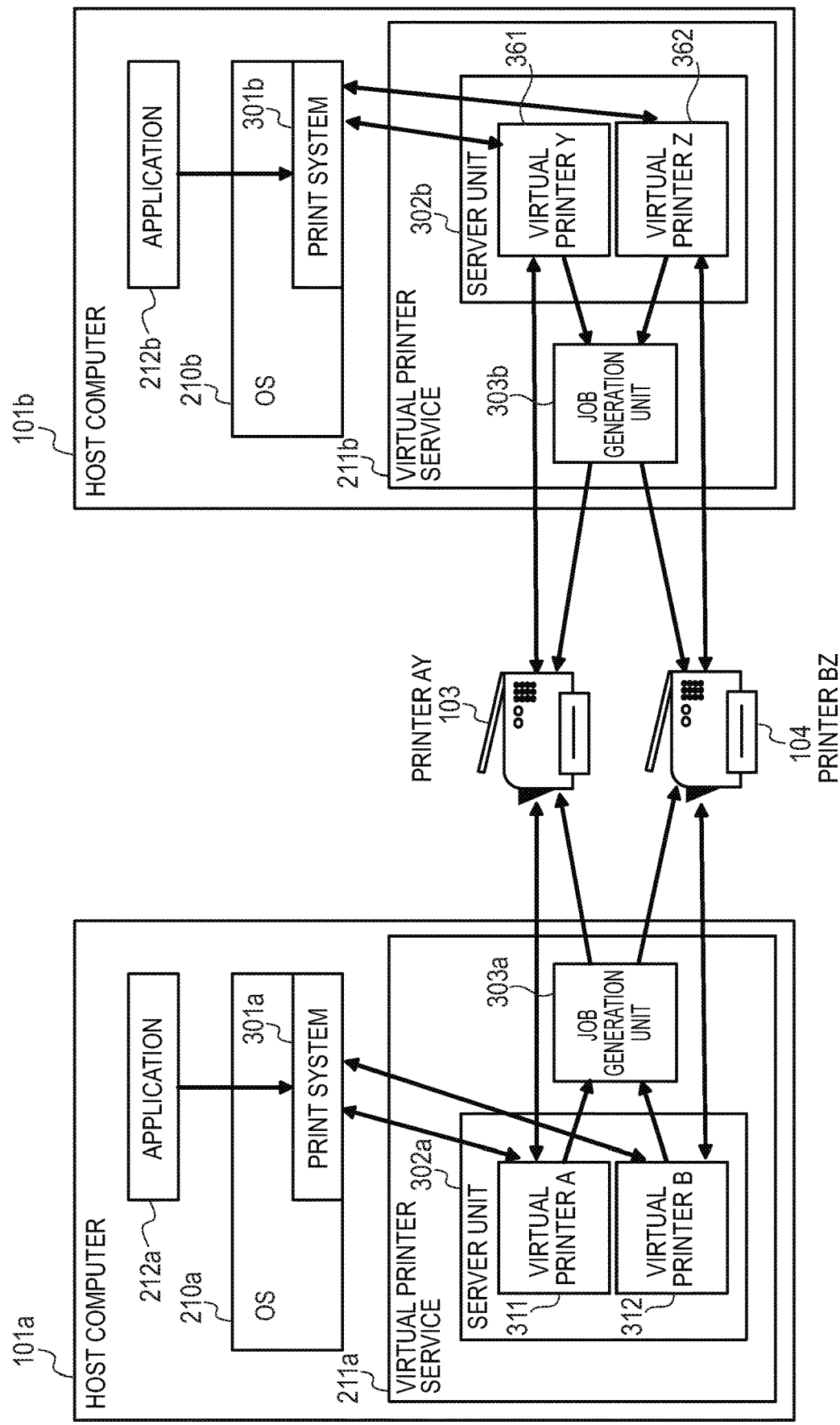
FIG. 3 is a software configuration diagram of the host computer.

FIG. 3 is a diagram illustrating a software configuration of the host computers 101a and 101b. One of the functions of the OS 210a installed in the host computer 101a is a print system 301a. The print system 301a performs control related to a printing operation provided from the host computer 101a. The print system 301a is a print system that enables printing without using a printer driver by using a particular protocol. For example, the print system 301a is a print system supported by AirPrint (registered trademark) by Apple, Inc., Android (registered trademark) by Google LLC, Mopria (registered trademark) of Windows (registered trademark) by Microsoft Corp., or the like.

The virtual printer service 211a has a job generation unit 303a and a server unit 302a. A virtual printer A311 or a virtual printer B312 is generated in the server unit 302a. In this example, the virtual printer A311 is generated in association with a printer AY103 that is an actual printer that forms an image on a sheet. Similarly, the virtual printer B312 is generated in association with a printer BZ104 that is an actual printer.

In the present embodiment, a component created by the virtual printer service 211 to the host computer 101 and responding as if it is an actual printer for a predetermined search protocol is referred to as a virtual printer (for example, the virtual printer A311, the virtual printer B312, or the like). The virtual printer receives print data in accordance with a particular protocol, creates or converts print data, and transmits the print data to an actual printer. Note that an actual printer main unit that forms an image on a sheet (for example, the printer AY103, the printer BZ104, or the like) is referred to as an actual printer.

Note that, in response to receiving a printer search request (a device search request) in accordance with a predetermined search protocol from the OS 210a, the virtual printer A311 and the virtual printer B312 reply with printer information in accordance with the search protocol described above. Further, the virtual printers A311 and B312 also perform communication for detection or the like of the state of the associated printer AY103 or printer BZ104 in accordance with the search protocol described above. Note that, in the present embodiment, a search protocol supported by the OS 210 of the host computer 101 will be described by using the Bonjour (registered trademark) protocol by Apple Inc., as an example. In the Bonjour protocol, the Multicast DNS technology is used for device search. Note that the search protocol described above is not limited to the Bonjour but may be another protocol having a similar function.

The virtual printer A311 (the virtual printer B312) receives a print job from the print system 301a of the OS 210 that registers the virtual printer A311 (the virtual printer B312) as a destination of the print job based on a response to the search request described above. The virtual printer A311 (virtual printer B312) converts the received print job into a predetermined format that can be understood by the job generation unit 303a and transmits the converted print job to the job generation unit 303a. The job generation unit 303a has a role of generating a print job in a format that can be processed by an actual printer (the printer AY103 or the printer BZ104) with respect to a print job received by each virtual printer from the print system 301a and transmitting the generated print job to the actual printer. Note that the function of the job generation unit 303 may be included in the virtual printer. That is, a virtual printer may generate a print job that can be processed by an actual printer from a received print job and transmit the generated print job to the actual printer.

The host computer 101b also has the same configuration as the host computer 101a. That is, one of the functions of the OS 210b installed in the host computer 101b is a print system 301b. The print system 301b performs control related to a printing operation provided from the host computer 101b. The virtual printer service 211b has a job generation unit 303b and a server unit 302b. A virtual printer Y361 or a virtual printer Z362 is generated in the server unit 302b. In this example, the virtual printer Y361 is generated in association with a printer AY103 that is an actual printer. Similarly, the virtual printer Z362 is generated in association with a printer BZ104 that is an actual printer. Note that a virtual printer may be referred to as a virtual device, and a virtual printer service may be referred to as a virtual device service.

Figure 4:
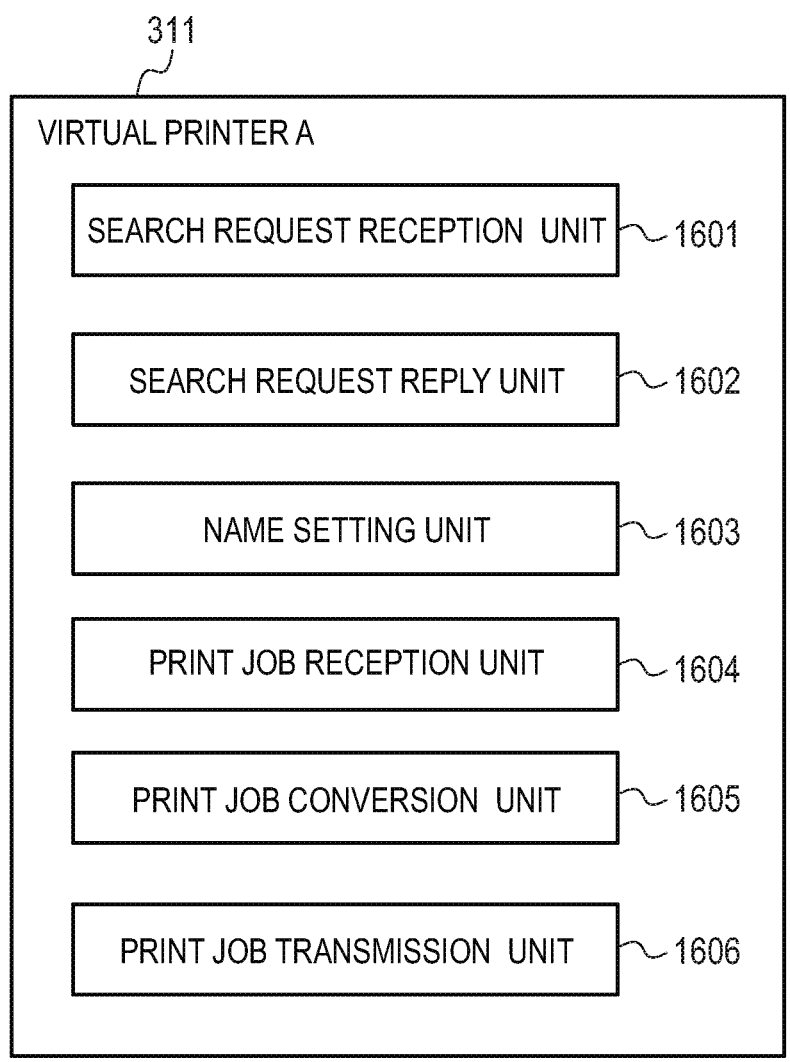
FIG. 4 is a diagram of a software configuration of a virtual printer.

FIG. 4 is a diagram illustrating an example of a software configuration of a virtual printer. Note that, although FIG. 4 illustrates the virtual printer A311 as an example, the same applies to other virtual printers.

The virtual printer of the present embodiment has a search request reception unit 1601, a search request reply unit 1602, a name setting unit 1603, a print job reception unit 1604, a print job conversion unit 1605, and a print job transmission unit 1606.

The search request reception unit 1601 receives a printer search request in accordance with the Bonjour protocol. The search request reply unit 1602 replies (responds) to a printer search request with printer information in accordance with the Bonjour protocol. Note that the search request reception unit 1601 and the search request reply unit 1602 respond only to a search request according to the Bonjour protocol.

Figure 10A:
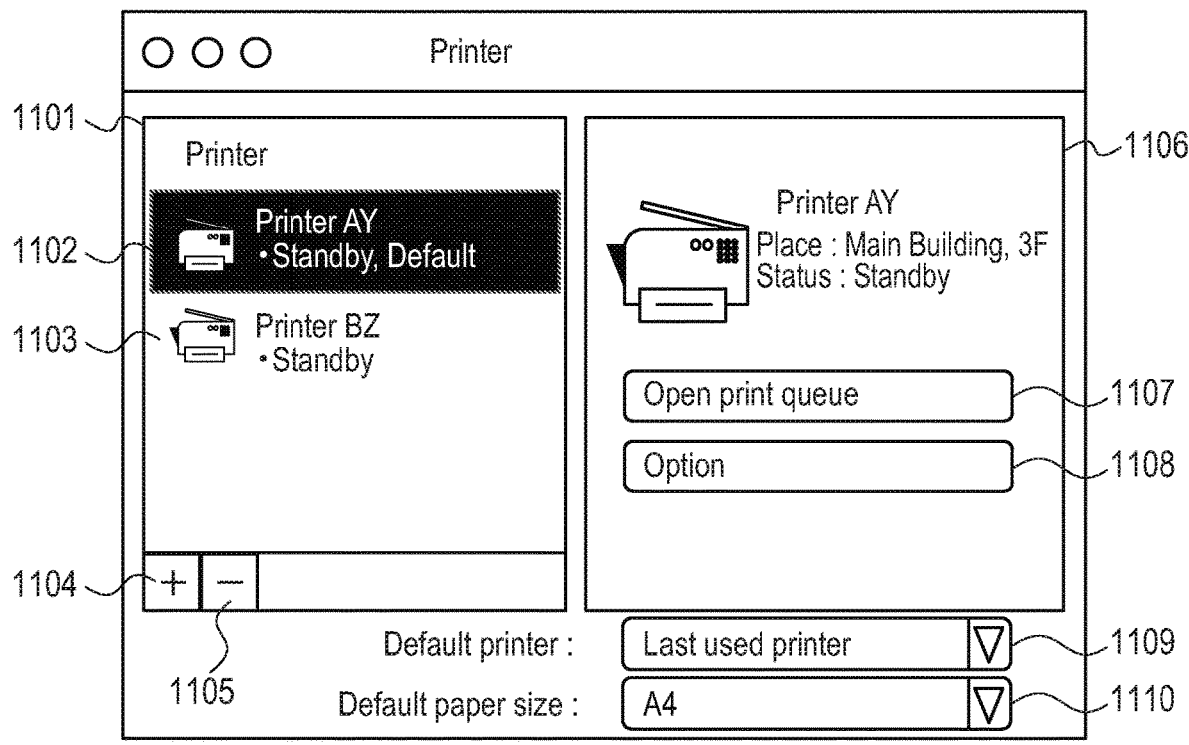
FIG. 10A is a diagram illustrating an example of a UI used for registering an output printer in the OS.
Figure 10B:
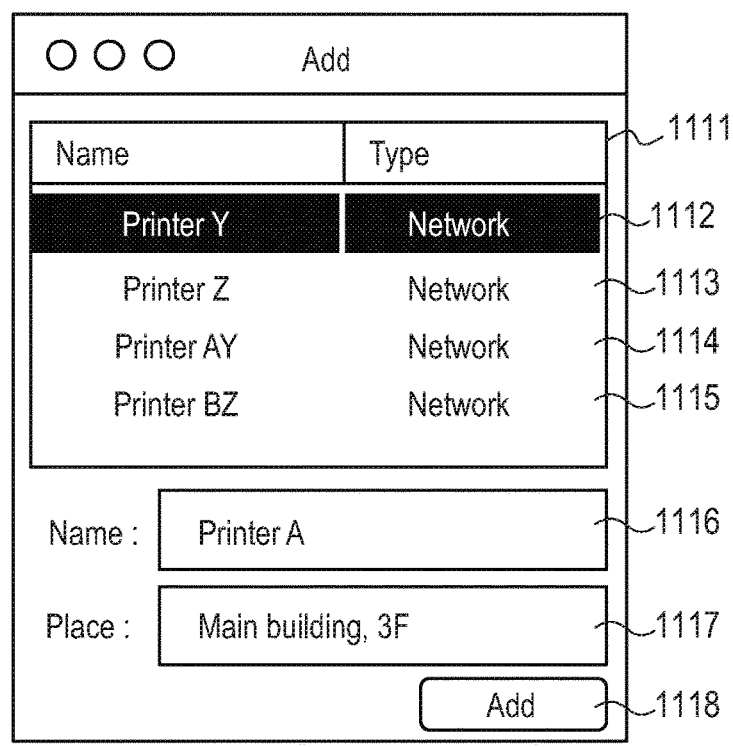
FIG. 10B is a diagram illustrating an example of another UI used for registering an output printer in the OS.

The name setting unit 1603 adds an identifier to a printer name (a device name) replied by the search request reply unit 1602 to a printer search request in accordance with the Bonjour protocol. The identifier is illustrated in FIG. 10A and FIG. 10B described later.

The print job reception unit 1604 receives a print job from the print system 301a in a particular protocol. The print job reception unit 1604 receives a print job generated when a file that is a source of the print job is opened by the application 212a within the host computer 101a and the user provides a print instruction on the application, for example. The application 212a may include various applications that can operate on the OS 210a, such as a word processor application, a spread sheet application, a web browser application, an image edition application, or the like, for example.

The print job conversion unit 1605 converts a print job received by the print job reception unit 1604 into a format that can be recognized by the job generation unit 303a. Note that the format that can be recognized by the job generation unit 303a may be a PDF format, for example, but not limited thereto. The print job transmission unit 1606 transmits a print job converted by the print job conversion unit 1605 to the job generation unit 303a.

Figure 5:
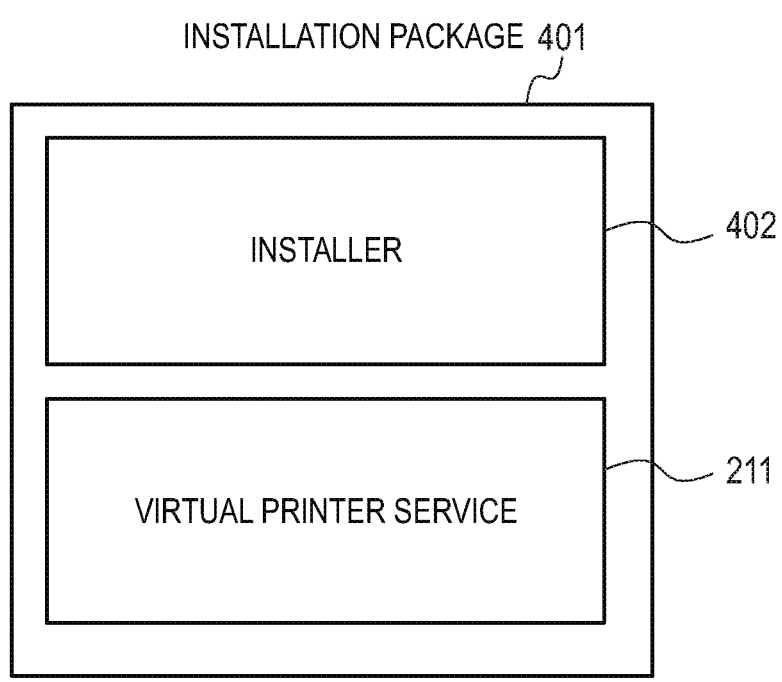
FIG. 5 is a diagram of a software configuration of an installation package of a virtual printer service.

FIG. 5 is a diagram illustrating an example of a software configuration of an installation package used for installing a virtual printer service.

An installation package 401 includes an installer 402 and a virtual printer service 211. When the installation package 401 is executed on the host computer 101, the installer 402 operates and performs an installation process of the virtual printer service 211 in the host computer 101. With such an installation process, the virtual printer service 211 is stored in the external memory 209 of the host computer 101, loaded to the RAM 202 when a program is executed, and executed by the CPU 201. Note that the virtual printer service 211 is an application and can generate a plurality of virtual printers.

Figure 6:
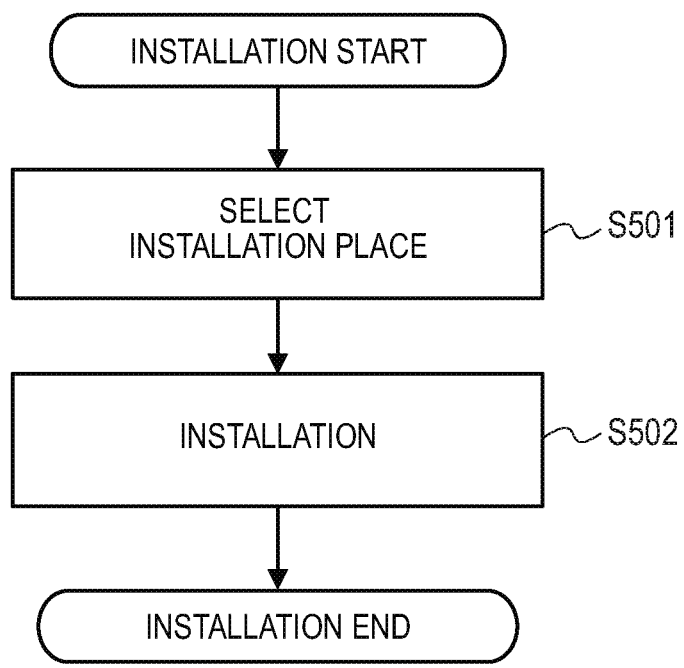
FIG. 6 is a flowchart illustrating an example of an installation process of the virtual printer service.

FIG. 6 is a flowchart illustrating an example of an installation process of the virtual printer service 211. Such an installation process is started when the installation package 401 of the virtual printer service downloaded from a predefined website (or stored in a storage media such as a CD-ROM) is executed by the OS 210 of the host computer, for example.

In step S501, the installer 402 included in the installation package 401 performs a selection process for selecting a component to which a virtual printer service is installed. The installer 402 displays an installing place selection window (not illustrated) on the display 207 of the host computer 101 and acquires information on an installing place input by the user on the installing place selection window. On the installing place selection window, for example, a message such as "Please select a disk to install the virtual printer service" is displayed to facilitate selection of an external memory to which a virtual printer service is installed.

Next, in step S502, the installer 402 installs the virtual printer service 211 to the host computer 101. The installing place is a place according to the information on the installing place acquired in step S501 described above. The installed virtual printer service 211 is executed by the OS 210 and started up. When started up, the virtual printer service 211 displays a main UI (FIG. 8A described later) of the virtual printer service 211 if no virtual printer is generated. Note that the main UI can also be displayed by a user operation. Once the main UI (FIG. 8A described later) of the virtual printer service 211 is displayed, the virtual printer service 211 starts a generation process for generating the virtual printer illustrated in FIG. 7.

Figure 7:
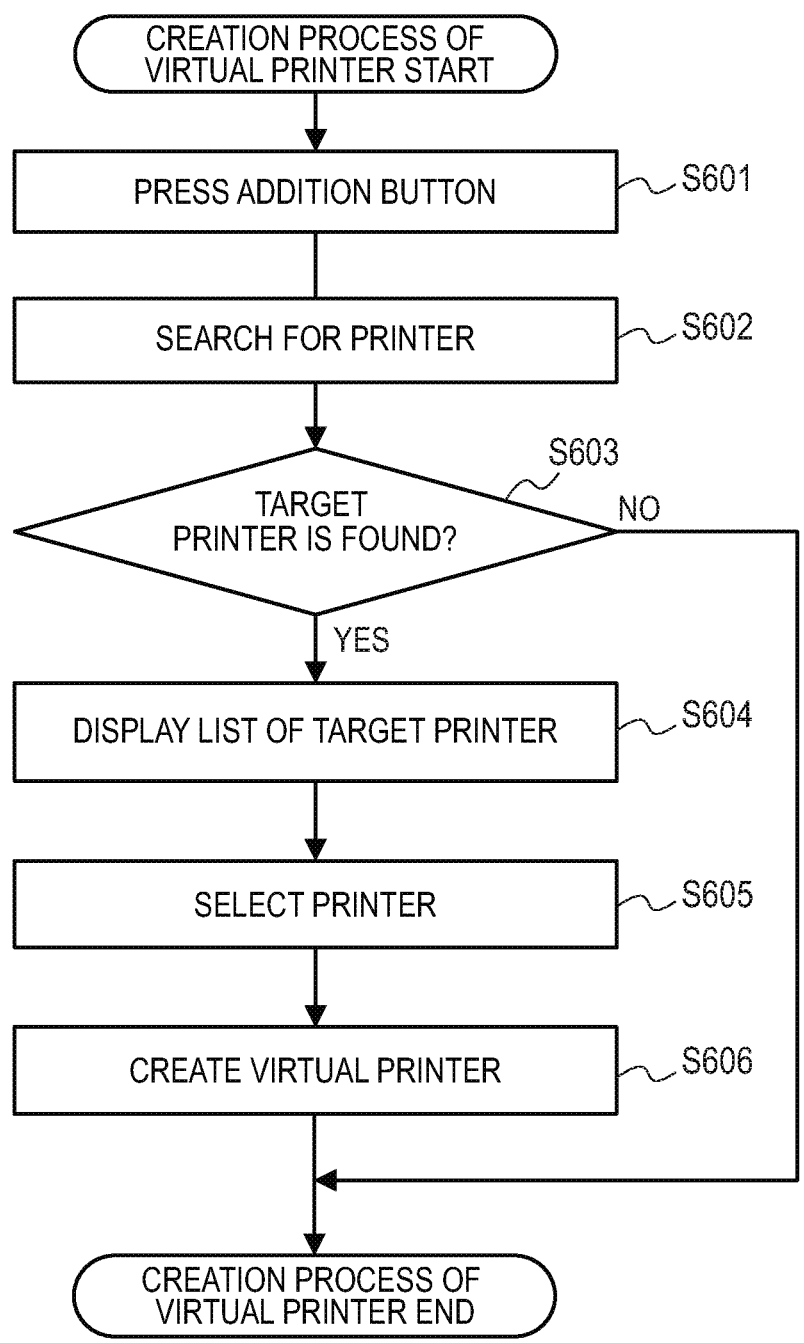
FIG. 7 is a flowchart illustrating an example of a generation process of a virtual printer in a first embodiment.

FIG. 7 is a flowchart illustrating an example of the generation process for generating the virtual printer in the first embodiment. The process of this flowchart is performed by the virtual printer service 211.

In step S601, when an add button is pressed by the user on the main UI, this is detected by the virtual printer service 211. The add button refers to a "+" (plus) button 1004 in FIG. 8A described later. The virtual printer service 211 that has detected the "+" button 1004 being pressed displays an addition window used for adding a virtual printer illustrated in FIG. 8B described later and proceeds with the process to step S602. Herein, the UI of the virtual printer service 211 will be described with reference to FIG. 8A and FIG. 8B.

Figure 8A:
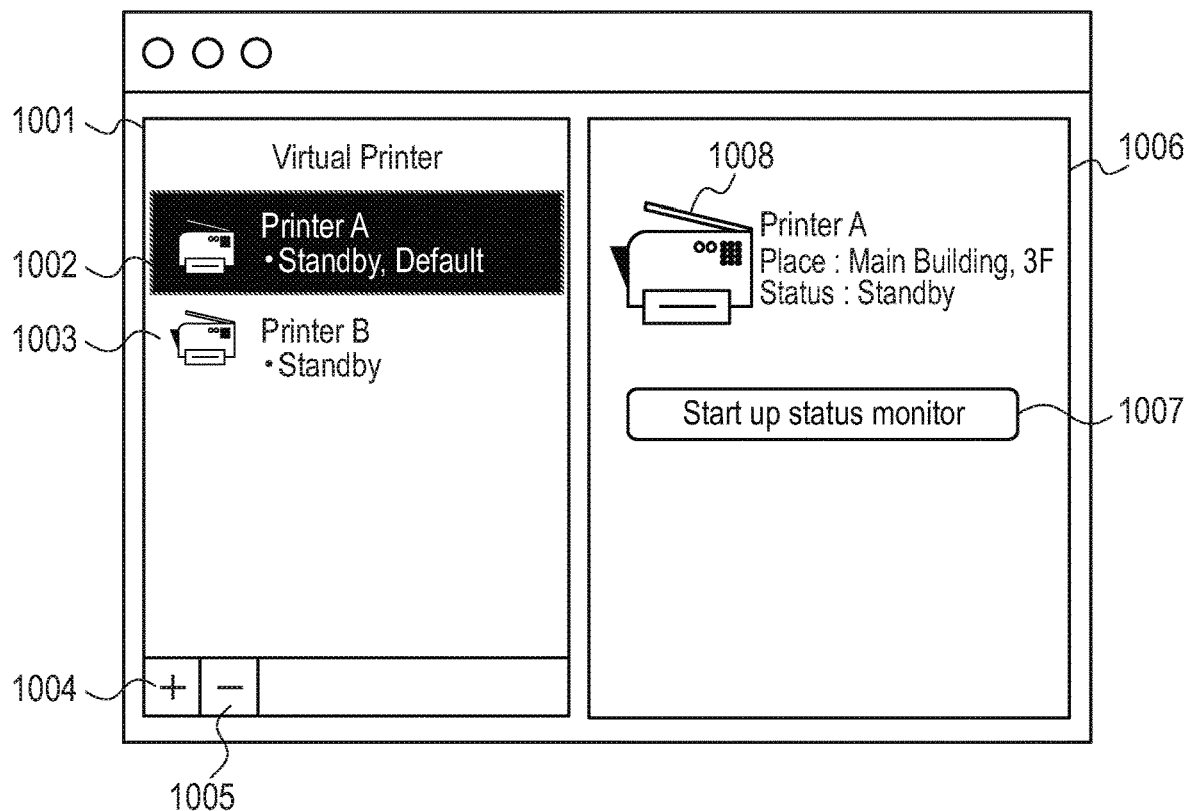
FIG. 8A is a diagram illustrating an example of a UI of the virtual printer service.
Figure 8B:
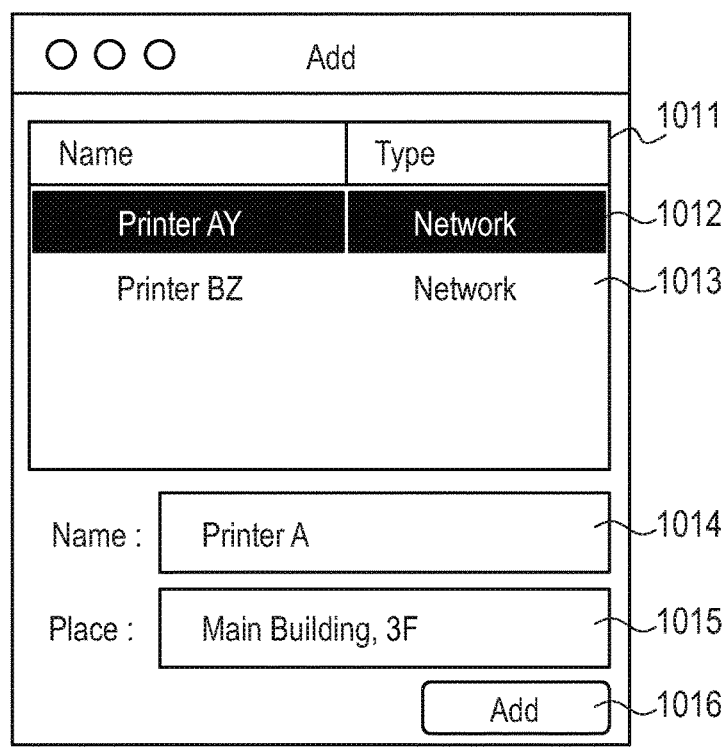
FIG. 8B is a diagram illustrating an example of another UI of the virtual printer service.

FIG. 8A and FIG. 8B are diagrams illustrating an example of the UI of the virtual printer service 211. The UI of the virtual printer service 211 is displayed on the display 207 of the host computer 101 in which the virtual printer service 211 is started up.

FIG. 8A illustrates an example of the main UI of the virtual printer service. In FIG. 8A, a list of virtual printers created by the server unit 302 is provided in a printer list region 1001. The example of FIG. 8A illustrates the UI in a state where two virtual printers (a printer A and a printer B) have already been registered.

In a region 1002, an icon, the name, and the status of the virtual printer A311 are displayed. Similarly, in a region 1003, an icon, the name, and the status of the virtual printer B312 are displayed. Note that since no virtual printer has been generated in the virtual printer service 211 immediately after installed, the region 1001 is in a state where the virtual printer list is blank.

The user may add a virtual printer by pressing the "+" (plus) button 1004. The UI displayed when the "+" button 1004 is pressed will be described later with reference to FIG. 8B. Further, the user may delete a virtual printer selected in the printer list region 1001 by pressing a "−" (minus) button 1005.

Further, in a region 1006, more detailed information on the virtual printer selected in the printer list region 1001 is displayed. Specifically, an icon representing a printer and a name, a place, the status, or the like of the printer are displayed. Furthermore, it is possible to display the state of the printer AY103 in more detail by pressing a "Start up status monitor" button 1007.

FIG. 8B illustrates an example of the UI (a virtual printer addition window) displayed when the "+" button 1004 of FIG. 8A is pressed. In a region 1011 of FIG. 8B, a list of printers supported by the virtual printer service 211 out of printers present on a network connected to the host computer 101 or one or more printers connected via USB is provided. In this example, the printer AY103 and the printer BZ104 connected to the network 100 are displayed in a region 1012 and a region 1013, respectively. The user selects, from the list, a printer for which a virtual printer is to be created, inputs a name 1014 and a place 1015, and presses an add button 1016. Accordingly, the UI returns to the window of FIG. 8A, and the virtual printer name (the name input in the name 1014) of the added virtual printer is added to and displayed in the printer list region 1001.

Figure 12:
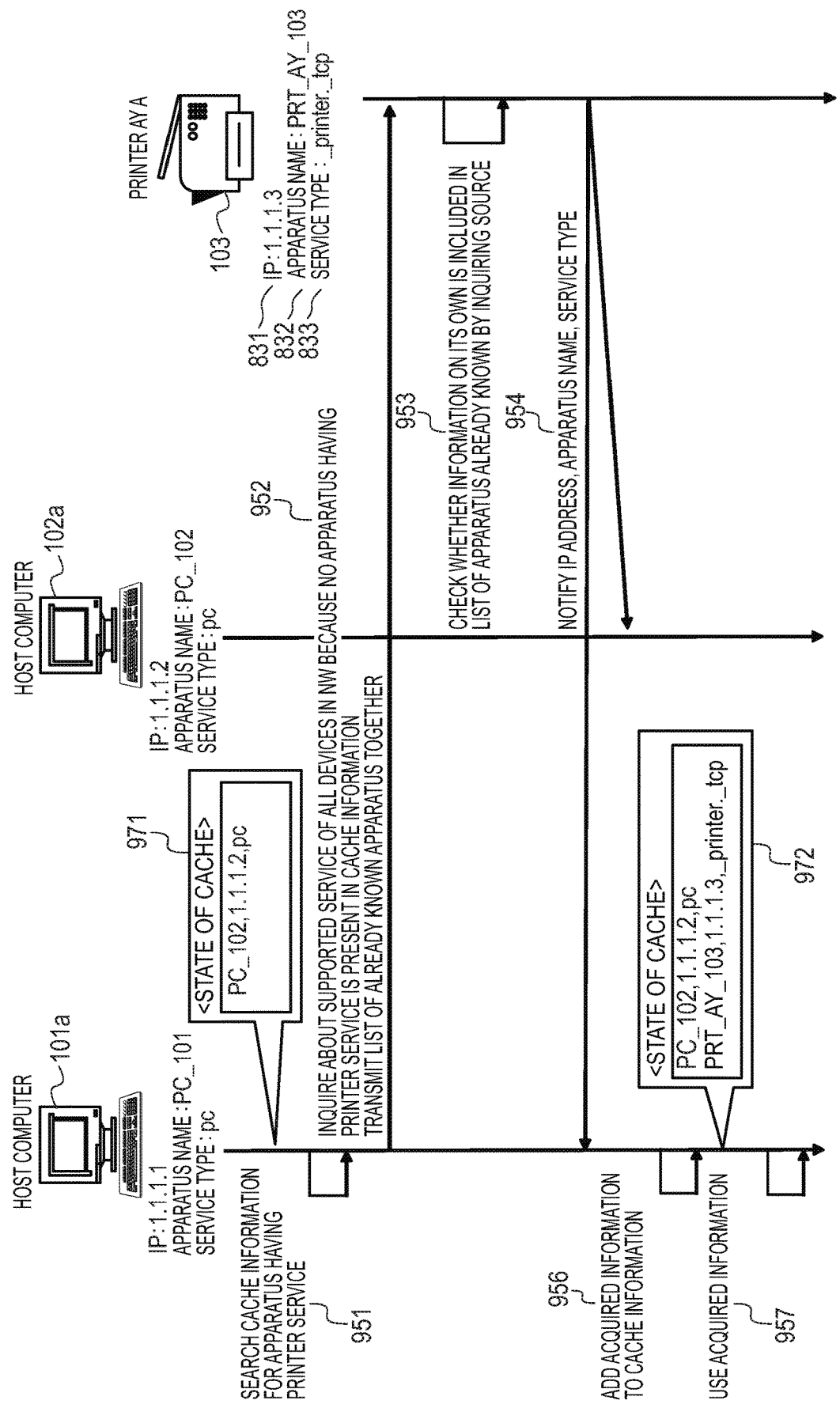
FIG. 12 is a sequence diagram of an apparatus search process on a network.

Turning back to FIG. 7, the flowchart thereof will be described below. The virtual printer service 211 that displays the virtual printer addition window (FIG. 8B) performs a process of searching for a printer in step S602. The search process for a printer is implemented by performing a process as illustrated in FIG. 12 described later. For example, device search is performed when a search request in accordance with the Bonjour protocol is transmitted from the virtual printer service 211 to the network 100 and a response to the search request is received from an apparatus on the network 100.

Next, in step S603, the virtual printer service 211 determines whether or not a target printer of the virtual printer service 211 is included in the printers found in step S602 described above. A list of target printers of the virtual printer service held inside the virtual printer service 211 is used for the determination as to whether or not the found printer is a target printer. If the printer found in step S602 described above is included in this list, the virtual printer service 211 determines that this printer is the target printer.

Table 1 illustrates information on a list of target printers of the virtual printer service as an example.

TABLE 1

|  | Printer name |
| --- | --- |
| Target printer of virtual printer service | Printer AY<br>Printer BZ<br>Printer CX |

In the list of target printers, only the printers supported by the virtual printer service 211 are listed out of the printers not supported by a print system that enables printing without using a printer driver (that is, the printers not supported by a particular protocol). The present list is held inside the virtual printer service 211 before installation of the virtual printer service 211. In Table 1, the printer name represents the name of the related printer.

Further, Table 2 illustrates information of a list of printers found in step S602 described above as an example.

TABLE 2

|  | Printer name | IP address | Service type |
| --- | --- | --- | --- |
| Found printer | Printer AY<br>Printer BZ | 1.1.1.3<br>1.1.1.4 | _printer._tcp<br>_printer._tcp |

In Table 2, the printer name represents the name of the related printer. The printer name is the name of a printer held in advance in the related printer and corresponds to a printer name notified (responded) in accordance with the Bonjour protocol from the related printer when found in step S602 described above. Note that, in general, a printer name is a name associated with a printer model, and also in Table 1, such a printer name is used.

Further, the IP address represents an address on a network of the related printer. Further, the service type represents a service supported by the related printer. For example, it is indicated that an apparatus having a service type "_printer._tcp" is a printer supported by a Line Printer Daemon (LPD) protocol. Note that all the printers found in step S602 described above are listed in the list of Table 2.

The virtual printer service 211 compares the printers indicated in Table 1 and Table 2 and thereby determines whether or not the searched printer is a target printer in the virtual printer service. In the example illustrated in Table 1 and Table 2, it is determined that the printer AY and the printer BZ are target printers. In this determination, a list of printers that are not supported by a particular protocol but are supported by the virtual printer service 211 (a so-called white list) is used as an example. That is, the configuration in which, when a found printer is included in the list, the found printer is determined as a target printer is illustrated. However, this determination may be made by using a list of printers that are supported by a particular protocol or are not supported by the virtual printer service 211 (a so-called black list). In such a case, when a found printer is not included in the list, the found printer is determined as a target printer. That is, any configuration may be employed that selects a printer for which a virtual printer is to be generated by the virtual printer service 211 based on information such as a list by which a printer not supported by a particular protocol or a printer supported by the virtual printer service 211 can be identified.

Furthermore, the first embodiment is configured such that a virtual printer is not included in a target printer. In the searching in step S602 described above, not only an actual printer on the network 100 but also a virtual printer created on a host computer which has started up the virtual printer service 211 or created on another host computer on the network 100 is found. Thus, in the first embodiment, a process for excluding the found virtual printers from target printers is performed in the determination of a target printer in step S603. This process will be described in detail in FIG. 16 described later, and the description thereof is thus omitted here.

In step S603 described above, if no target printer of a virtual printer service is included in the printers found in step S602 described above (S603, NO), the virtual printer service 211 ends the process of the present flowchart.

On the other hand, if a target printer of a virtual printer service is included in the printers found in step S602 described above (S603, YES), the virtual printer service 211 proceeds with the process to step S604.

In step S604, the virtual printer service 211 displays the printer name of the printer determined to be a target printer in step S603 described above in the region 1011 of the virtual printer addition window (FIG. 8B). In the example described above, the printer names of the printer AY103 and the printer BZ104 connected to the network 100 are displayed in the region 1012 and the region 1013, respectively. That is, the virtual printer service 211 presents, to the user, a list of printers selected based on the list as described above (for example, a list such as Table 1) out of the printers found in step S602 described above.

Next, in step S605, the virtual printer service 211 performs a process for selecting a printer to be a connection target of the virtual printer. When the add button 1016 is pressed by the user via the operation input device 205 such as a mouse in a state where any one of the printers is selected in the region 1011 of FIG. 8B, this is detected by the virtual printer service 211. The virtual printer service 211 then acquires the printer name of the printer selected in the region 1011, the name 1014, and information on the place 1015 from the virtual printer addition window (FIG. 8B). In the example of FIG. 8B, "Printer AY" is acquired as the printer name of the selected printer, "Printer A" is acquired as the name, and "Main building, 3F" is acquired as information on the place.

Next, in step S606, the virtual printer service 211 performs a generation process of the virtual printer. In this process, the printer selected in step S605 described above is associated as a connection target, and a virtual printer is generated based on the name and the place acquired in step S605 described above. Note that the virtual printer generated in this process has information notified of by the printer defined by the Bonjour protocol. This information may include, for example, information on a connection target of a virtual printer, the name of a virtual printer, a function of a virtual printer, a virtual printer flag ON indicating that a printer is a virtual printer, or the like. The connection target of a virtual printer corresponds to an IP address of a printer selected in step S605 described above, for example. Specifically, the IP address acquired at the searching in step S603 described above (illustrated in Table 2 as an example) may be employed. Further, the function of a virtual printer corresponds to a support Page Description Language (PDL), a support function, or the like, for example. Such a function of the virtual printer is different for respective printers selected in step S605 described above and is held inside the virtual printer service 211 before installation of the virtual printer service.

Note that, to perform printing by using a generated virtual printer, it is necessary to register the virtual printer in the OS 210 as a service program. The virtual printer registered in the OS 210 as a service program always operates during execution of the OS 210 and responds to an inquiry from another program or information terminal. The sequence indicating an apparatus search process illustrated in FIG. 13 described later is an example thereof. Accordingly, from another program or information terminal, the virtual printer appears as if it exists as an actual printer. Thus, the virtual printer may be found in the same manner as an actual printer in step S602 described above. In the present embodiment, since a found virtual printer is excluded from target printers, the virtual printer whose connection target is the found virtual printer is not generated.

Figure 9:
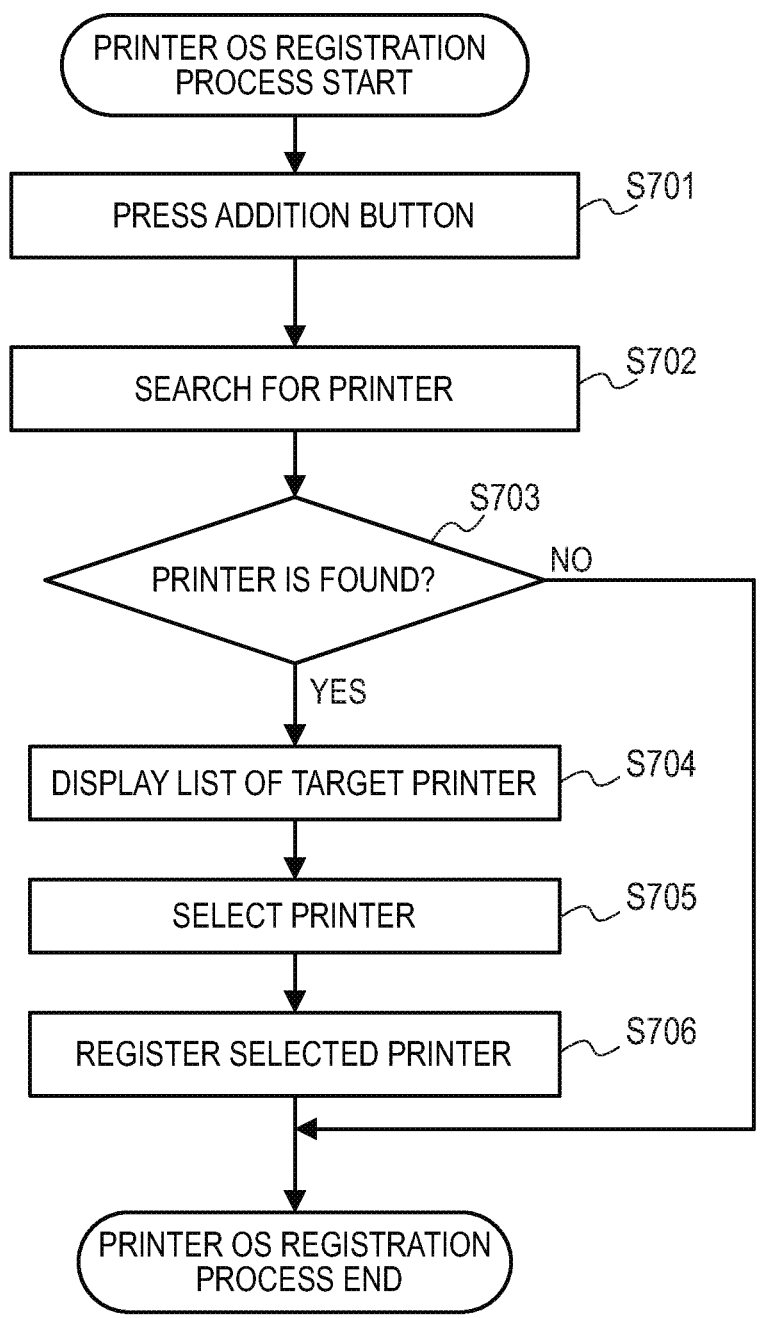
FIG. 9 is a flowchart illustrating one example of a printer registration process in OS.

The process of registering a virtual printer in the OS will be described below. FIG. 9 is a flowchart illustrating an example of a printer registration process in the OS 210. The process of this flowchart is started when the main UI (FIG. 10A) used for registering an output printer in the OS 210 is displayed in accordance with a user operation.

In step S701, when the add button is pressed by the user, this is detected by the print system 301 of the OS 210. The add button refers to a "+" (plus) button 1104 in FIG. 10A described later. In response to detecting that the "+" button 1104 is pressed down, the print system 301 of the OS 210 displays a registration window of a printer illustrated in FIG. 10B and proceeds with the process to step S702. Here, the UI used for registering an output printer in the OS 210 will be described with reference to FIG. 10A and FIG. 10B.

FIG. 10A and FIG. 10B are diagrams illustrating an example of the UI used for registering an output printer in the OS 210. The UI used for registering an output printer in the OS 210 is displayed on the display 207 of the host computer 101 in which the OS 210 is started up.

FIG. 10A illustrates the main UI used for registering an output printer in the OS 210. In a printer list region 1101 of FIG. 10A, a list of printers that have already been registered in the OS 210 as output printers is provided. The example of FIG. 10A illustrates the UI in a state where two printers (the printer AY and the printer BZ) have already been registered. In a region 1102, an icon, the name, and the status of the printer AY are displayed. Similarly, in a region 1103, an icon, the name, and the status of the printer BZ are displayed.

The user may additionally register a printer by pressing the "+" (plus) button 1104. The UI displayed when the "+" button 1104 is pressed will be described later with reference to FIG. 10B. Further, the user may delete a printer selected in the printer list region 1101 by pressing a "−" (minus) button 1105.

Further, in a region 1106, more detailed information on the printer selected in the printer list region 1101 is displayed. Specifically, an icon representing a printer and a name, a place, the status, or the like of the printer are displayed. Furthermore, it is possible to display the state of the printer selected in the region 1101 in more detail by pressing an "Open print queue" button 1107. Furthermore, it is possible to change the configuration of options (not illustrated) of the printer selected in the region 1101 or display a window displaying the level of print agents such as toner or ink by pressing an "Option" button 1108.

FIG. 10B illustrates an example of the UI (a printer addition window) displayed when the "+" button 1104 of FIG. 10A is pressed. In a region 1111 of FIG. 10B, a list of actual printers present on the connected network or actual printers or virtual printers connected via USB is provided and presented to the user. The user may select a printer intended to register from the list of the region 1111 and input a name 1116 and a place 1117. Then, an add button 1118 is pressed finally, the UI returns to the window of FIG. 10A, and the registered printer is added to and displayed in the printer list region 1101.

Figure 13:
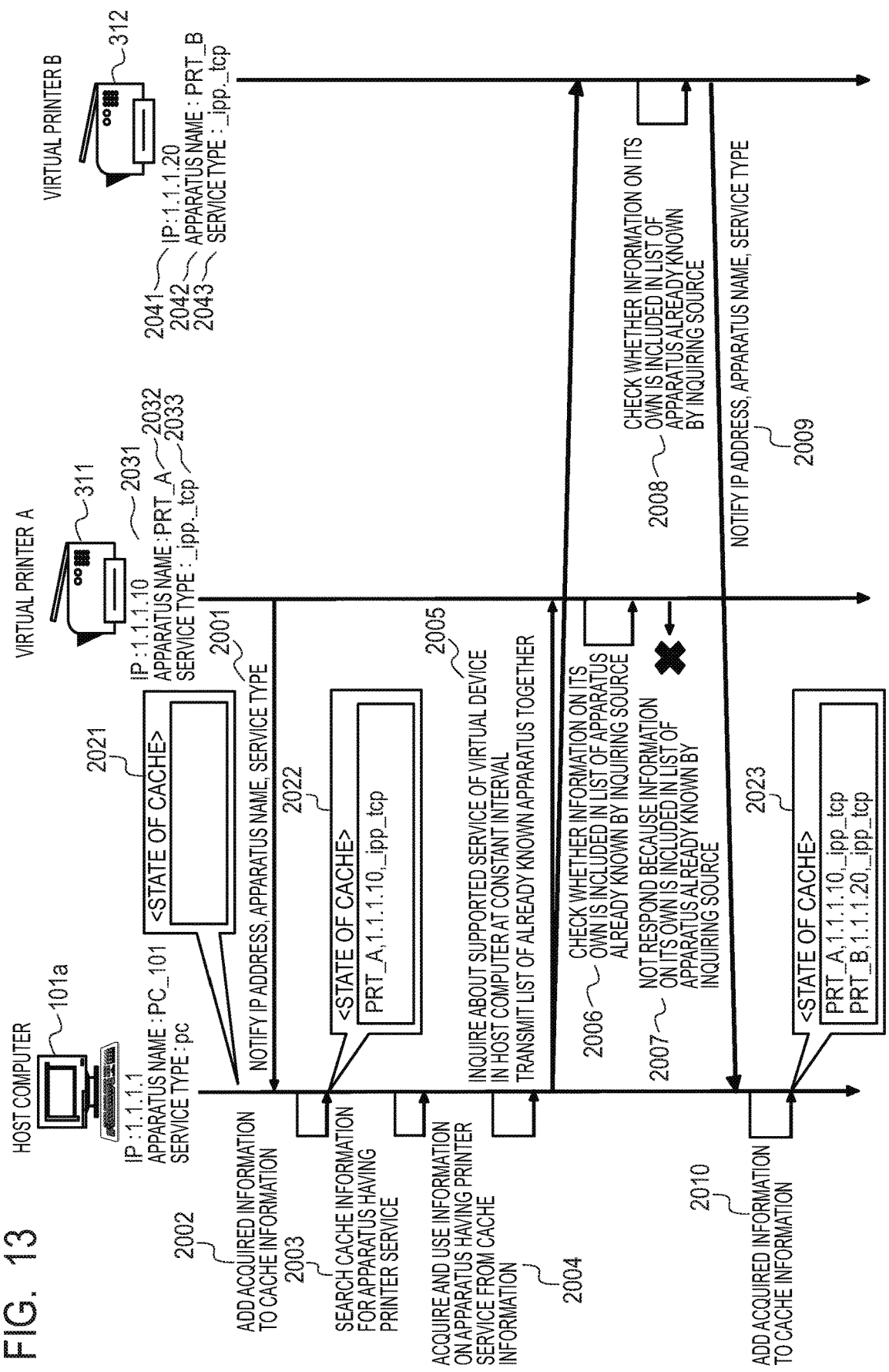
FIG. 13 is a sequence diagram of a virtual printer search process within a host computer.

Turning back to FIG. 9, the description thereof is continued below. The print system 301 of the OS 210 that displays the printer registration window of FIG. 10B performs a process of searching for a printer in step S702. The search process is implemented by performing a process as illustrated in FIG. 12 and FIG. 13 described later. For example, device search is performed when a search request in accordance with the Bonjour protocol is transmitted from the OS 210 to the network 100 and a response to the search request is received from an apparatus on the network 100. Next, in step S703, the print system of the OS determines whether or not a printer has been found in step S702 described above.

Table 3 illustrates information of a list of printers found in step S703 described above as an example.

TABLE 3

|  | Printer name | IP address | Service type |
|---|---|---|---|
| Found printer | Printer Y | 1.1.1.30 | _ipp._tcp |
|  | Printer Z | 1.1.1.40 | _ipp._tcp |
|  | Printer AZ | 1.1.1.3 | _printer._tcp |
|  | Printer BZ | 1.1.1.4 | _printer._tcp |

In Table 3, the printer name represents the name of the related printer and corresponds to a printer name notified (responded) in accordance with the Bonjour protocol from the related printer. The IP address represents an address on a network of the related printer. The service type represents a service supported by the related printer. For example, it is indicated that an apparatus having a service type "_printer._tcp" is a printer supported by the LPD protocol. Further, it is indicated that an apparatus having a service type "_ipp._tcp" is a printer supported by the Internet Printing Protocol (IPP).

It is assumed here that an apparatus whose service type is "_printer._tcp" or "_ipp._tcp" is determined to be a printer. In the printers listed in Table 3, printers matching the above condition are "Printer Y", "Printer Z", "Printer AY", and "Printer BZ".

In step S703 described above, if no printer is found in step S702 described above (S703, NO), the print system 301 of the OS 210 ends the process of the present flowchart. On the other hand, in step S703, if a printer is found in step S702 described above (S703, YES), the print system 301 of the OS 210 proceeds with the process to step S704.

In step S704, the print system 301 of the OS 210 lists and displays, as a printer, the apparatus determined as a printer in step S703 described above in the region 1111 of FIG. 10B. Therefore, a list of one or more actual printers present on the connected network or one or more actual printers connected via USB, and further one or more virtual printers are provided in the region 1111. The listed virtual printers may include not only a virtual printer created on the host computer in which the OS 210 is executed but also a virtual printer created by another host computer present on a network connected to the host computer of interest. In the example of FIG. 10B, the printer names of the actual printers AY and BZ connected to the network are displayed in a region 1114 and a region 1115. Further, the printer names of the virtual printers Y and Z created in another host computer (denoted as 101*b*) on the network 100 are also displayed in a region 1112 and a region 1113. Note that only the printers supported by the print system of the OS 210 (supported by a particular protocol) may be displayed in the region 1111 of FIG. 10B.

Next, in step S705, the print system 301 of the OS 210 performs a process for selecting a printer to be registered in the OS 210. When the add button 1118 is pressed by the user in a state where a printer is selected in the region 1111 of FIG. 10B, this is detected by the print system 301 of the OS 210. The print system 301 then acquires the printer name of the selected printer, the name 1116, and information on the place 1117 from the virtual printer registration window (FIG. 10B). In the example of FIG. 10B, "Printer Y" is acquired as the printer name of the selected printer, "Printer A" is acquired as the name of the printer, and "Main building, 3F" is acquired as information on the place.

Next, in step S706, the print system 301 of the OS 210 registers a printer in the OS 210. This process is to register the printer selected in step S705 described above in the OS 210. The connection target information is the IP address acquired at the searching in step S703 described above (illustrated in Table 3 as an example), and registration in the OS 210 is performed based on the name and the information on the place of the printer acquired in step S705 described above.

The IP address to be connected, the name, and the place of the registered printer are stored in the external memory 209 of the host computer 101. The UI then returns to the window of FIG. 10A, and the registered printer is added to and displayed in the printer list region 1101. Then, the registered printer can be selected as a destination of a print job from a print setup window (not illustrated) of the OS 210 opened from the application 212, and printing using a particular protocol is enabled.

Figure 11:
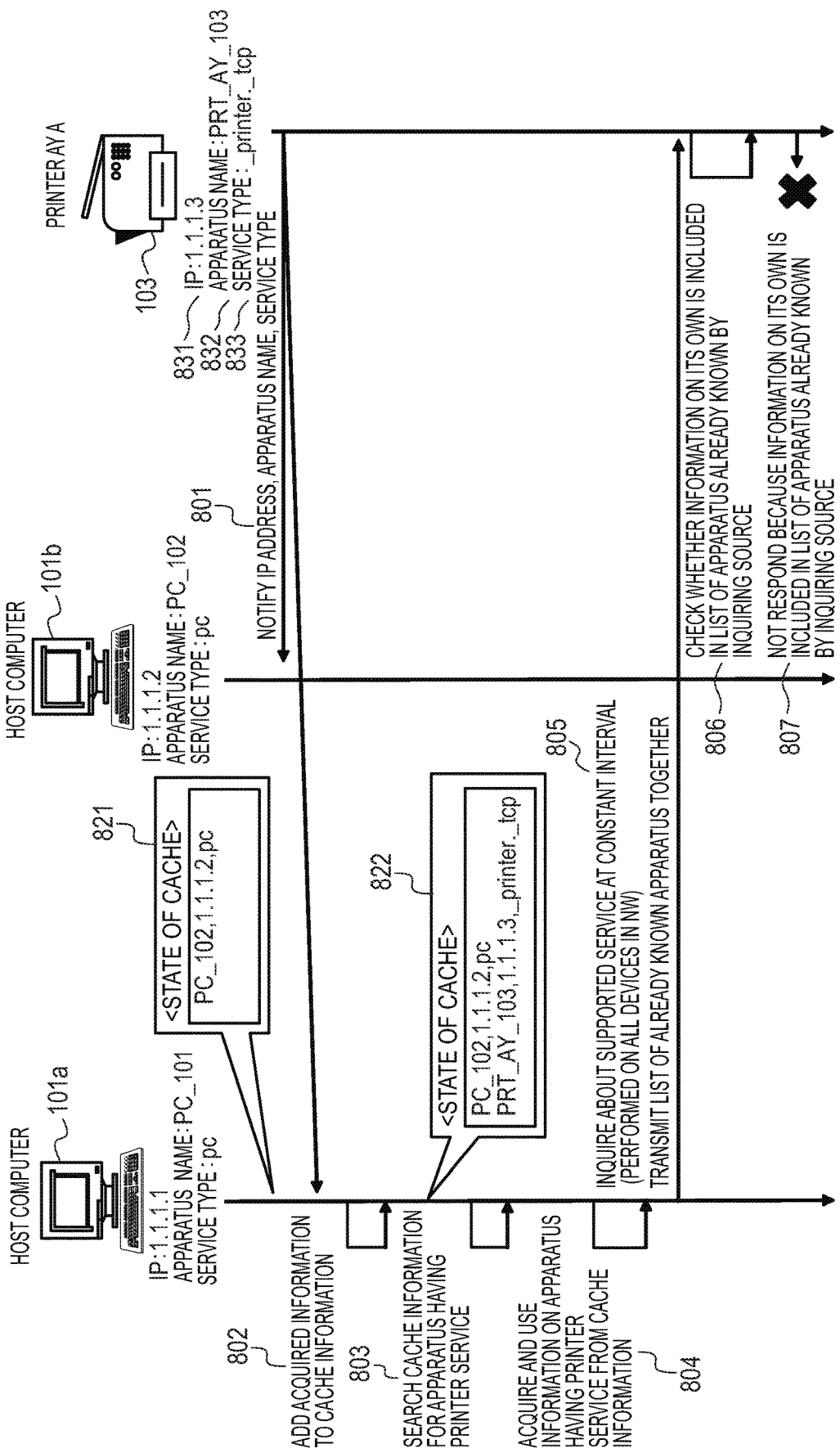
FIG. 11 is a sequence diagram of an apparatus search process on a network.

A sequence of the apparatus search process on a network will be described below. FIG. 11 is a sequence diagram when the printer AY103 provides a notification of the presence thereof in the apparatus search process on a network.

In response to participating in a network, the printer AY103 notifies apparatuses on the same network of an IP address 831, an apparatus name 832, and a service type 833 of the printer AY103 by using the Multicast DNS technology (801). That is, a notification of printer information is provided in accordance with the Bonjour protocol. The service type refers to a value indicating a service supported by an apparatus in the Bonjour protocol. Table 4 illustrates an example of service types representing printers.

TABLE 4

| Service type |
|---|
| _printer._tcp |
| _ipp._tcp |

The host computer 101*a* that has received the notification from the printer AY103 adds the IP address 831, the apparatus name 832, and the service type 833 of the printer AY103 to cache information 821 (802). The cache information is information used in a mechanism to reduce a load on a network in the Bonjour protocol. Table 5 illustrates an example of information included in the cache information.

TABLE 5

|  | IP address | Apparatus name | Service type |
|---|---|---|---|
| Cache information | 1.1.1.2 | PC_102 | Pc |
|  | 1.1.1.3 | PRT_AY | _printer._tcp |
|  | . | . | . |
|  | . | . | . |

Then, when searching for an apparatus on the network, the host computer 101a first searches the cache information 822 for an apparatus having a service type illustrated in Table 4 as the service type (803). If information on the printer AY103 is included in the cache information, the information on the printer AY103 included in the cache information is used for the subsequent process (804).

Furthermore, the host computer 101a performs an inquiry about a supported service on apparatuses present on the same network at constant intervals by using the Multicast DNS technology (805). That is, a device search request in accordance with the Bonjour protocol is transmitted. Note that the host computer 101a notifies the apparatus present on the same network of a list of apparatuses (a list based on the cache information 822) already known by the host computer 101a together with the inquiry.

The printer AY103 that has received the inquiry from the host computer 101a checks whether or not the printer AY103 is included in the list 822 of apparatuses already known by the host computer 101a (806). In this example, the printer AY103 determines that the printer AY103 is included in the list 822 of apparatuses already known by the host computer 101a and does not respond to the inquiry from the host computer 101a (807).

FIG. 12 is a sequence diagram when a notification of the IP address 831, the apparatus name 832, and the service type 833 is provided from the printer AY103 in response to searching from the host computer 101a in the apparatus search process on the network.

The host computer 101a searches cache information 971 for an apparatus having a service type illustrated in Table 4 as a service type (951). If the related apparatus is not present in the cache information 971, the host computer 101a performs an inquiry about a supported service on apparatuses present on the same network by using the Multicast DNS technology (952). That is, a device search request in accordance with the Bonjour protocol is transmitted. Note that, also when the related apparatus is present, the host computer 101a performs an inquiry about a supported service on the apparatus present on the same network at constant intervals, as illustrated in 805 of FIG. 11 described above. Note that the host computer 101a notifies the apparatus present on the same network of a list 971 of apparatuses already known by the host computer 101a together with the inquiry.

The printer AY103 checks whether or not the printer AY103 is included in the list (the list based on the cache information 971) of apparatuses already known by the host computer 101a (953). In this example, the printer AY103 determines that the printer AY103 is not included in the list 971 of apparatuses already known by the host computer 101a. The printer AY103 then notifies the apparatus present on the same network of the IP address 831, the apparatus name 832, and the service type 833 of the printer AY103 by using the Multicast DNS technology (954). That is, the printer AY103 responds with the printer information in accordance with the Bonjour protocol.

The host computer 101a then adds the IP address 831, the apparatus name 832, and the service type 833 of the printer AY103 to the cache information 971 (956). The host computer 101a uses information received from the printer AY103 in the subsequent process (957).

FIG. 13 is a sequence diagram of a search process for a virtual printer created inside a host computer. The virtual printer A311 and the virtual printer B312 are created inside the host computer 101a. Here, the virtual printer A311 provides a notification of the presence thereof from the virtual printer A311. Further, an example in which the virtual printer B312 provides a notification of the presence thereof in response to searching from the host computer 101a will be described.

The virtual printer A311 notifies the host computer 101a of an IP address 2031, an apparatus name 2032, and a service type 2033 of the virtual printer A311 by using the Multicast DNS technology (2001). That is, a notification of printer information is provided in accordance with the Bonjour protocol.

The host computer 101a that has received the notification from the virtual printer A311 adds the IP address 2031, the apparatus name 2032, and the service type 2033 of the virtual printer A311 to cache information (2021) (2002).

Then, when searching for a virtual printer included in the host computer 101a, the host computer 101a first searches the cache information 2022 for an apparatus having a service type illustrated in Table 4 as a service type (2003). If the information on the virtual printer A311 is included in the cache information, the information on the virtual printer A311 included in the cache information is used for the subsequent process (2004).

Furthermore, the host computer 101a performs an inquiry about a supported service on a virtual printer inside the host computer 101a at constant intervals by using the Multicast DNS technology (2005). That is, a device search request in accordance with the Bonjour protocol is transmitted. The host computer 101a notifies the virtual printer inside the host computer 101a of a list of apparatuses (a list based on cache information 2022) already known by the host computer 101a together with the inquiry.

The virtual printer A311 that has received the inquiry from the host computer 101a checks whether or not the virtual printer A311 is included in the list 2022 of apparatuses already known by the host computer 101a (2006). The virtual printer A311 determines that the virtual printer A311 is included in the list 2022 of apparatuses already known by the host computer 101a and does not respond to the inquiry from the host computer 101a (807).

The virtual printer B312 that has received the inquiry from the host computer 101a checks whether or not the virtual printer B312 is included in the list 2022 of apparatuses already known by the host computer 101a (2008). The virtual printer B312 determines that the virtual printer B312 is not included in the list 2022 of devices already known by the host computer 101a. The virtual printer B312 then notifies the host computer 101a of an IP address 2041, an apparatus name 2042, and a service type 2043 of the virtual printer B312 by using the Multicast DNS technology (2009). That is, the virtual printer B312 responds with the printer information in accordance with the Bonjour protocol.

The host computer 101a adds the IP address 2041, the apparatus name 2042, and the service type 2043 of the virtual printer B312 to the cache information 2022 (2010).

Figure 14:
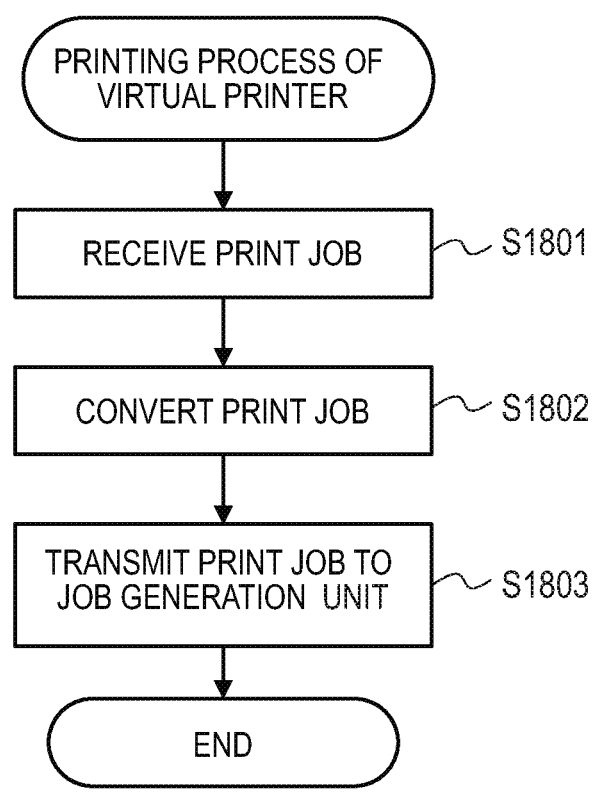
FIG. 14 is a flowchart illustrating an example of a process when the virtual printer performs printing.

FIG. 14 is a flowchart illustrating an example of a process when a virtual printer performs printing. In step S1801, in response to receiving a print job from the print system 301 in the OS 210, the virtual printer (for example, the virtual printer A311) proceeds with the process to step S1802.

In step S1802, the virtual printer converts a print job received in step S1801 described above into a format that can be recognized by the job generation unit 303. Here, the format that can be recognized by the job generation unit 303 may be, for example, a PDF format. Next, in step S1803, the virtual printer transmits a print job converted in step S1802 described above to the job generation unit 303 and ends the process of the present flowchart.

Figure 15:
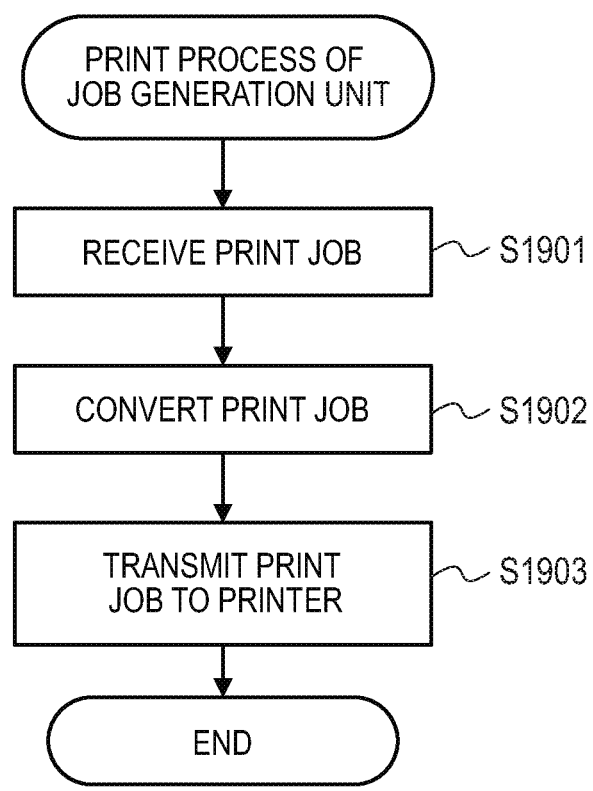
FIG. 15 is a flowchart illustrating an example of a process when a job generation unit performs printing.

FIG. 15 is a flowchart illustrating an example of a process when the job generation unit 303 performs printing. In step S1901, in response to receiving a print job from a virtual printer (for example, the virtual printer A311), the job generation unit 303 in the virtual printer service 211 proceeds with the process to step S1902.

In step S1902, the job generation unit 303 converts the print job received in step S1901 described above into a format that can be recognized (interpreted) by the actual printer (for example, the printer AY103) associated with the virtual printer that is a source of the print job described above. Here, the format that can be recognized by the actual printer may be, for example, a raster format.

Next, in step S1903, the job generation unit 303 transmits the print job converted in step S1902 described above to the actual printer associated with the virtual printer that is the source of the print job described above and ends the process of the present flowchart.

As described above with FIG. 7, when device search is performed when a virtual printer is created, not only an actual printer on the network 100 but also a virtual printer created on the host computer of interest or another host computer will be found. Thus, in the first embodiment, a process of excluding such a virtual printer from target printers of the virtual printer service is performed. This process will be described below with reference to FIG. 16.

Figure 16:
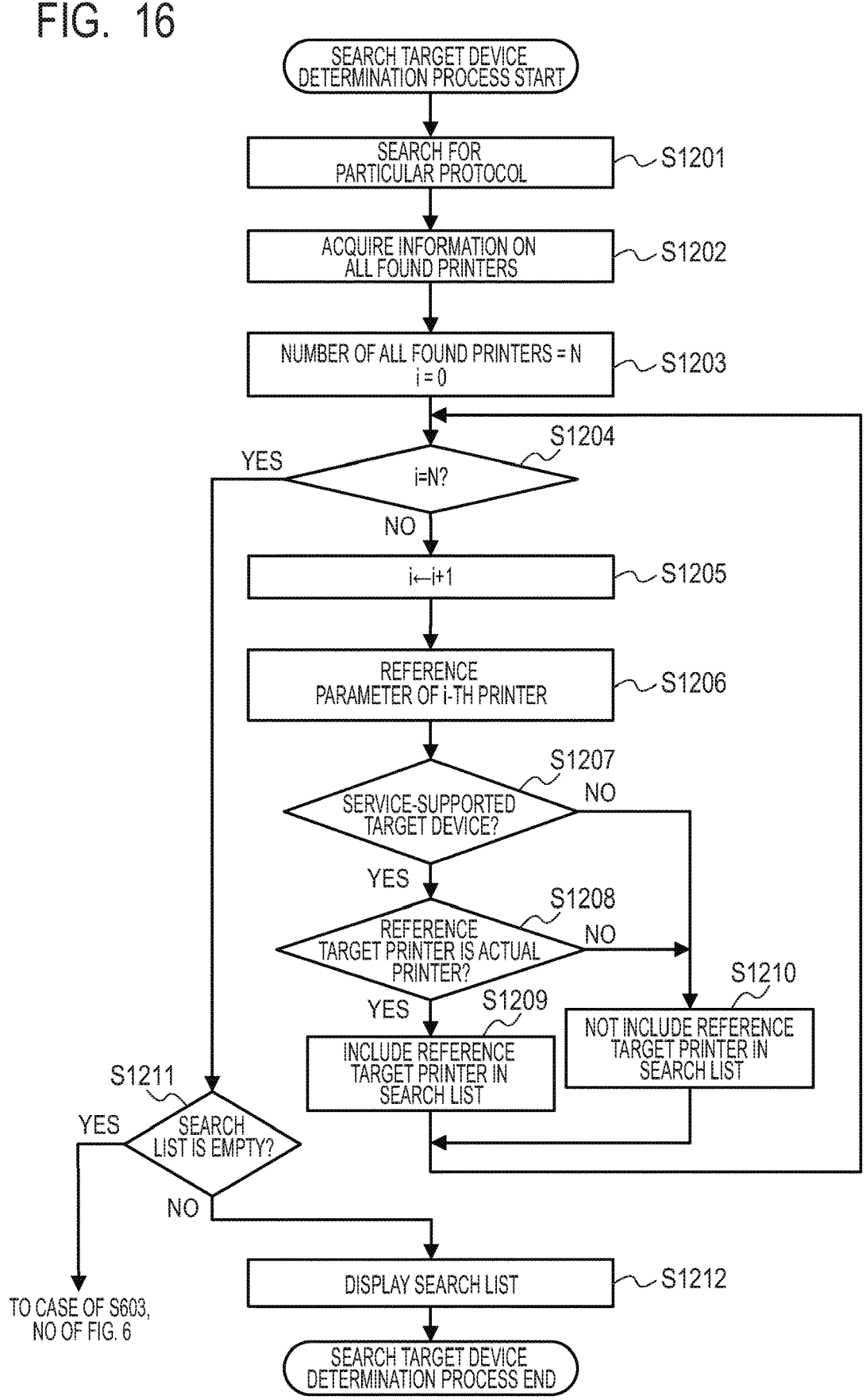
FIG. 16 is a flowchart illustrating an example of the operation of a virtual printer service of the first embodiment.

FIG. 16 is a flowchart illustrating an example of the operation of a virtual printer service of the first embodiment and, in particular, illustrates the process corresponding to steps S601, S602, and S603 of FIG. 7 in detail.

In step S1201, the virtual printer service 211 transmits a search request to search for a printer on the network 100 in accordance with a predetermined search protocol described above. Next, in step S1202, the virtual printer service 211 receives a response to the search request of S1201 described above from an apparatus on the network 100. This response includes a parameter of a search protocol as illustrated in Table 6 described later.

Table 6 illustrates below an example of parameters of a search protocol acquired as a response to the search request in step S1202 of FIG. 16.

Note that the search protocol described above is used for the printer found in steps S1201 to S1202 described above. Thus, the actual printer (103, 104, or the like) supported by this search protocol or the virtual printer (311, 312, 361, 362, or the like) created in the host computer of interest or another host computer are targeted. Furthermore, an actual printer is also targeted in searching because not only a product of a manufacturer providing the virtual printer service 211 but also other manufacturers' printers may respond if they are supported by the search protocol described above. It is here assumed that the printer AY, the printer BZ, the printer R, and the virtual printer A have been found for illustration.

Next, in step S1203, the virtual printer service 211 sets the total number of printers found in step S1201 described above to N and sets a variable i to the initial value "1". Next, in step S1204, the virtual printer service 211 determines whether or not i=N is met. Then, if i=N is not met (S1204, NO), the process proceeds to step S1205.

In step S1205, the virtual printer service 211 adds 1 to i. Next, in step S1206, the virtual printer service 211 references information (parameter) on the i-th printer found in step S1201 described above out of the response information acquired in step S1202 described above. Hereafter, the i-th printer will be referred to as a "reference target printer".

Next, in step S1207, the virtual printer service 211 determines whether or not the reference target printer is supported by the virtual printer service 211 from the printer information referenced in step S1206 described above. The determination as to whether or not the reference target printer is supported in this case is performed in accordance with comparison between a list (for example, Table 1) of target printers of the virtual printer service and the printer information (in particular, the printer name) referenced in step S1206, as illustrated with step S603 of FIG. 7. Accordingly, it is possible to exclude a printer not supported by a particular protocol or, for example, a printer manufactured by another manufacturer. Note that information on a manufacturer may be included in the response information, and a printer manufactured by another manufacturer may be excluded in accordance with the information.

In step S1207 described above, if the reference target printer is not supported by the virtual printer service 211 in accordance with the printer information referenced in step S1206 described above (S1207, NO), the virtual printer service 211 proceeds with the process to step S210. In step S210, the virtual printer service 211 returns the process to step S1204 without adding the printer name of the reference target printer to the search list.

On the other hand, in step S1207 described above, if the reference target printer is supported by the virtual printer service 211 in accordance with the printer information

TABLE 6

Parameters of Search Protocol

| | Virtual printer | Actual printer | Actual printer | Other manufacturer's printer |
|---|---|---|---|---|
| Manufacturer | Canxx | Canxx | Canxx | R company |
| IP address | 169.254.abc.xyz | 169.254.def.uvw | 169.254.klm.nop | 170.123.efg.hij |
| Printer name | Printer A | Printer AY | Printer BZ | Printer R |
| Virtual printer flag | 1 | 0 | 0 | — | referenced in step S1206 described above (S1207, YES), the virtual printer service 211 proceeds with the process to step S1208.

In step S1208, the virtual printer service 211 determines whether or not the reference target printer is an actual printer. The printer information (in particular, a virtual printer flag) referenced in step S1206 described above is used for the determination. If the virtual printer flag is ON (the virtual printer flag=1), the virtual printer service 211 determines that the reference target printer is a virtual printer. On the other hand, if he virtual printer flag is OFF (the virtual printer flag≠1), the virtual printer service 211 determines that the reference target printer is an actual printer.

In step S1208 described above, if the reference target printer is a virtual printer (not an actual printer) (S1208, NO), the virtual printer service 211 proceeds with the process to step S1210. In step S1210, the virtual printer service 211 returns the process to step S1204 without adding the printer name of the reference target printer to the search list.

On the other hand, in step S1208 described above, if the reference target printer is an actual printer (S1208, YES), the virtual printer service 211 proceeds with the process to step S1209. In step S1209, the virtual printer service 211 adds the printer name of the reference target printer to the search list and returns the process to step S1204.

Then, in step S1204 described above, if i=N is met (S1204, YES), the virtual printer service 211 proceeds with the process to step S1211. In step S1211, the virtual printer service 211 determines whether or not the search list is empty. Then, if the search list is empty (S1211, YES), the virtual printer service 211 transitions to the case of S603, NO in FIG. 7. That is, the virtual printer service 211 determines that no target printer of the virtual printer service is included in the searched printers and controls the creation process of the virtual printer illustrated in FIG. 7 to end.

On the other hand, in step S1211 described above, if the search list is not empty (S1211, NO), the virtual printer service 211 proceeds with the process to step S1212. In step S1211, the virtual printer service 211 displays the printer name within the search list in the region 1011 of the virtual printer addition window (FIG. 8B), ends the process of the present flowchart, and transitions to step S604 of FIG. 7.

FIG. 17A is a diagram illustrating an example of a target printer list (corresponding to 1011 in FIG. 8B) displayed in step S604 of FIG. 7 when the present embodiment is not applied. FIG. 17B is a diagram illustrating an example of a target printer list (corresponding to 1011 in FIG. 8B) displayed in step S604 of FIG. 7 (that is, step S1212 of FIG. 16) when the present embodiment is applied.

When the present embodiment is not applied, since the determination of step S1208 of FIG. 16 is not performed, a virtual printer is also added to the search list. Thus, as with step S1301 of FIG. 17A, "Printer A" that is a virtual printer is displayed in the target printer list (corresponding to 1011 of FIG. 8B). On the other hand, when the present embodiment is applied, the determination of step S1208 of FIG. 16 is performed, a virtual printer is not added to the search list. Thus, as with FIG. 17B, "Printer A" that is a virtual printer is not displayed in the target printer list (corresponding to 1011 of FIG. 8B).

As described above, even when a created virtual printer is found in a process of creating a virtual printer, it is possible to exclude the virtual printer from a target printer list that can be selected as a connection target of the virtual printer to be created. Accordingly, it is possible to prevent a virtual printer whose connection target is a virtual printer from being created. That is, even in an environment where a virtual printer is present on a network, it is possible to suitably create a virtual printer in accordance with a use's demand. As a result, for example, it is possible to prevent a situation where a virtual printer whose connection target is a virtual printer is selected for printing but the printing is not performed because a host computer in which the virtual printer of the connection target is created is not started up.

Second Embodiment

In the first embodiment described above, the configuration in which, even when a virtual printer is found in creation of a virtual printer, the virtual printer is unable to be selected as a connection target to prevent creation of a virtual printer whose connection target is the virtual printer has been described. In contrast, in a second embodiment, even when a virtual printer is found and selected as a connection target when a virtual printer is created, the virtual printer whose connection target is an actual printer of the connection target of the selected virtual printer is created. Such a configuration will be described below in detail.

Figure 18:
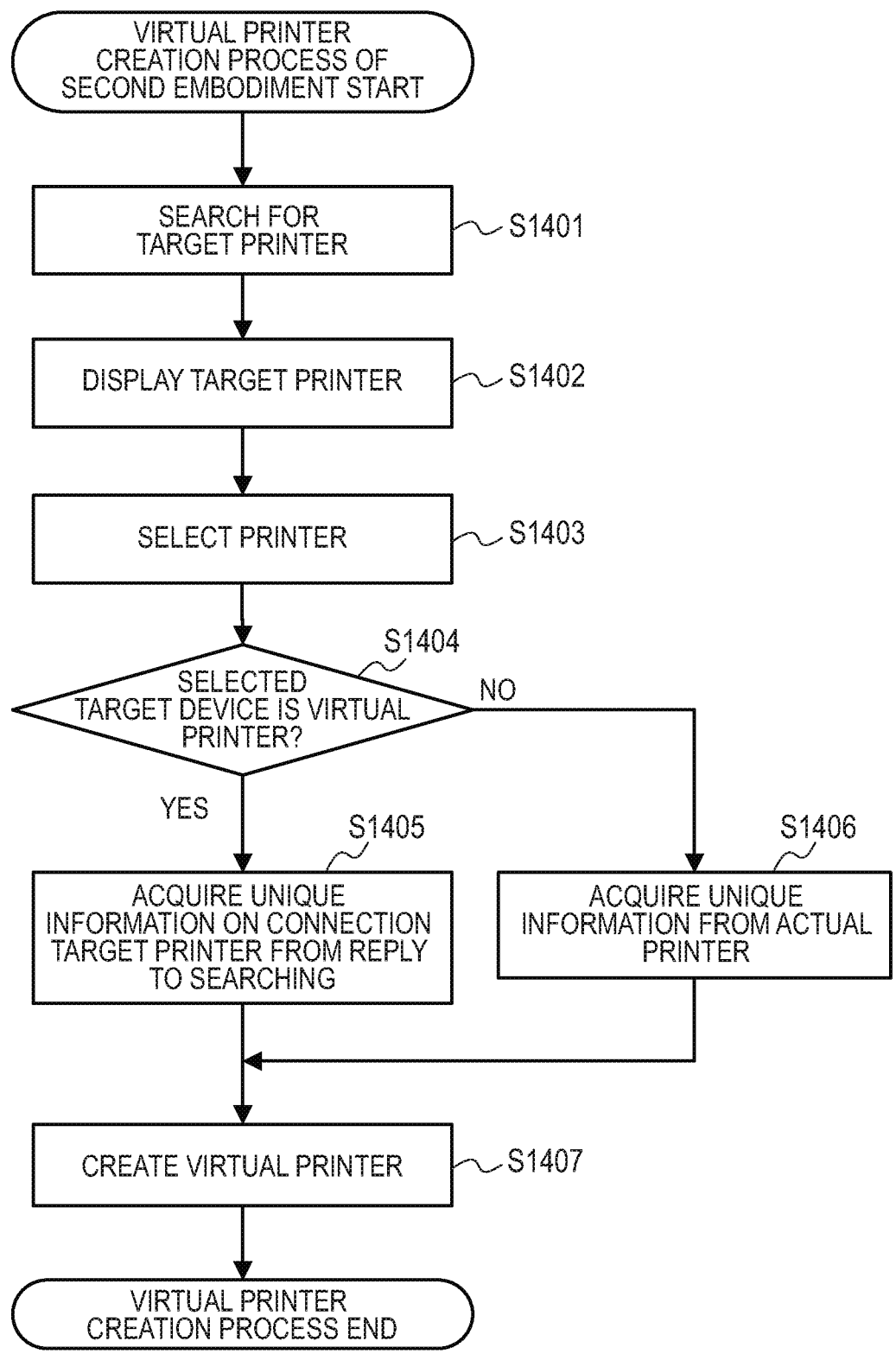
FIG. 18 is a flowchart illustrating an example of a generation process in a virtual printer in a second embodiment.

FIG. 18 is a flowchart illustrating an example of a generation process of a virtual printer in the second embodiment. The process of this flowchart is performed by the virtual printer service 211 when the add button ("+" button 1004) is pressed by the user on the main UI (FIG. 8A) of the virtual printer service.

Figure 19:
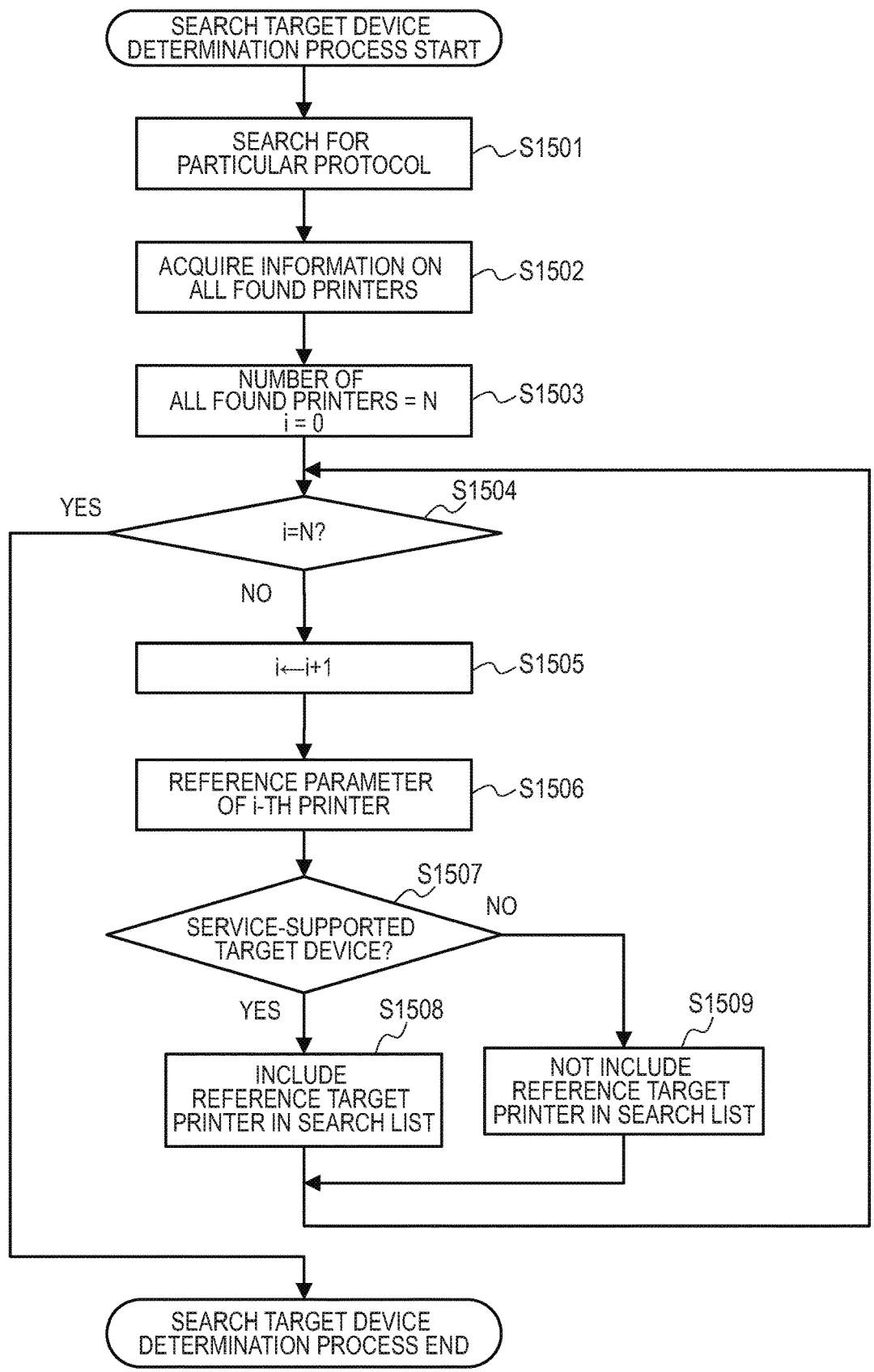
FIG. 19 is a flowchart illustrating an example of a search process in a target printer in the second embodiment.

In step S1401, the virtual printer service 211 executes a target printer search process (details are illustrated in FIG. 19). Here, the target printer search process of step S1401 will be described with reference to FIG. 19.

FIG. 19 is a flowchart illustrating an example of a search process for a target printer illustrated in step S1401 of FIG. 18. First, since the process of steps S1501 to S1507, S1508, and S1509 is the same as the process of steps S1201 to S1207, S1209, and S1210 of FIG. 16, the description thereof will be omitted. That is, in the target printer search process of FIG. 19, the determination process as to whether the reference target printer is an actual printer or a virtual printer as with step S1208 of FIG. 16 is not performed, and even a virtual printer is added to the search list. Note that, in FIG. 19, if i=N is met (S1504, YES) in step S1504, the process of the present flowchart ends, and the process transitions to step S1402 of FIG. 18.

Turning back to FIG. 18, the description thereof is continued below. In step S1402, the virtual printer service 211 displays a list of printer names of printers found in step S1401 described above. That is, the virtual printer service 211 displays the printer names in the search list created in the process of FIG. 19 in the region 1011 of the virtual printer addition window (FIG. 8B). In step S1401 described above, when a virtual printer is found, the virtual printer is also displayed therein.

Next, in step S1403, the virtual printer service 211 performs a printer selection process in which the user selects a printer from the printer list displayed in step S1402 described above. Since this process is the same as step S604 of FIG. 7, the description thereof will be omitted. However, when no target printer is found in step S1401 described above, the printer list described above will be empty. In such a case, since no printer can be selected from the list, the process of the present flowchart will end without performing the selection process though not illustrated in FIG. 18.

Next, in step S1404, the virtual printer service 211 determines whether the printer selected in step S1403 described above is a virtual printer or an actual printer. The printer information (in particular, the virtual printer flag) acquired in step S1401 described above (specifically, step S1502 of FIG. 19) is used for the determination. If the virtual printer flag of the printer selected in step S1403 described above is OFF (virtual printer flag≠1), the virtual printer service 211 determines that the selected printer is an actual printer. On the other hand, if the virtual printer flag is ON (virtual printer flag=1), the virtual printer service 211 determines that the selected printer is a virtual printer.

In step S1404 described above, if the reference target printer is an actual printer (not a virtual printer) (S1404, NO), the virtual printer service 211 proceeds with the process to step S1406. In step S1406, the virtual printer service 211 acquires unique information on the printer selected in step S1403 described above (for example, the printer AY103 or the like) and proceeds with the process to step S1407.

On the other hand, in step S404 described above, if the selected printer is a virtual printer (S1404, YES), the virtual printer service 211 proceeds with the process to step S1405. In step S1405, the virtual printer service 211 acquires unique information on an actual printer of the connection target (for example, the printer AY103 or the like) from response information on the virtual printer selected in step S1403 described above (for example, the printer A311 or the like) and proceeds with the process to step S1407.

Table 7 illustrates an example of parameters of a search protocol referenced in step S1405 of FIG. 18.

TABLE 7

| Parameters of Search Protocol | | |
|---|---|---|
| | Virtual printer | Actual printer |
| Manufacturer | Canxx | Canxx |
| IP address | 169.254.abc.xyz | 169.254.def.uvw |
| Printer name | Printer A | Printer AY |
| Virtual printer flag | 1 | 0 |
| IP address of associated actual printer | 169.254.def.uvw | — |
| Printer name of associated actual printer | Printer AY | — |

In step S1407, the virtual printer service 211 creates a virtual printer based on the unique information on the printer acquired in step S1405 or S1406 described above. That is, if an actual printer is selected from the found list, a virtual printer whose connection target is the actual printer is created. On the other hand, if a virtual printer is selected from the found list, a virtual printer whose connection target is an actual printer of a connection target of the virtual printer is created. After the process of step S1407 described above, the virtual printer service 211 ends the process of the present flowchart.

As described above, even when a created virtual printer is found and selected as a connection target by the user in a creation process of a virtual printer, it is possible to create a virtual printer whose connection target is an actual printer of a connection target of the selected virtual printer. Accordingly, it is possible to prevent a virtual printer whose connection target is a virtual printer (for example, the printer A311 or the like) from being created. That is, even in an environment where a virtual printer is present on a network, it is possible to suitably create a virtual printer in accordance with a user's demand. As a result, for example, it is possible to prevent a situation where a virtual printer whose connection target is a virtual printer is selected for printing but the printing is not performed because a host computer in which the virtual printer of the connection target is created is not started up.

Note that the present disclosure includes all the configurations in which the virtual printer service 211 searches for a printer upon a search request, determines whether or not the found printer is a virtual printer, and creates a virtual printer associated with a printer (actual printer) that is not a virtual printer as a connection target. As set forth, according to each of the embodiments, even in an environment where a virtual printer is present on a network, it is possible to suitably create a virtual printer in accordance with a user's demand while preventing creation of a virtual printer whose connection target is a virtual printer.

Note that the configuration of various data described above and the content thereof are not limited thereto and formed of various configurations or contents in accordance with a use or a purpose. As set forth, although one embodiment has been illustrated, the present disclosure may be implemented as an embodiment of a system, a device, a method, a program or a storage medium, or the like, for example. Specifically, the present disclosure may be applied to a system formed of a plurality of apparatuses or may be applied to a device formed of a single apparatus. Further, the present disclosure includes all the configurations in which any of the embodiments described above are combined.

OTHER EMBODIMENTS

The present disclosure can be realized by a process in which a program implementing one or more functions of the embodiment described above is supplied to a system or a device via a network or a storage medium and one or more processors in a computer of the system or the device read out and execute the program. Further, the present disclosure can be realized by a circuit (for example, an ASIC) that implements one or more functions. Further, the present disclosure may be applied to a system formed of a plurality of apparatuses or may be applied to a device formed of a single apparatus. The present disclosure is not limited to the embodiments described above, and various modification (including an organic combination of the embodiments) are possible based on the spirits of the present disclosure, which are not excluded from the scope of the present disclosure. That is, the present disclosure includes all the configurations in which any of the embodiments described above and the modified examples thereof are combined.

According to the present disclosure, even in an environment where a virtual device is present on a network, it is possible to suitably create a virtual device in accordance with a user's demand.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-104450, filed on Jun. 4, 2019, which is hereby incorporated by reference herein in its entirety.

What is claimed is:
1. An information processing device comprising:
a controller including a processor and a memory, the controller configured to:
issue a printer search request to search for a printer;
receive a response to the issued printer search request;

determine whether the response to the printer search request has been received from a printer or from a virtual printer that causes a printer to print;

display, on a display, information of the printer based on a determination that the response to the printer search request has been received from a printer, and not display information of the virtual printer based on a determination that the response to the printer search request has been received from a virtual printer that causes a printer to print; and create a virtual device configured to cause the printer whose information has been displayed and selected by a user to print and respond to a printer search request.

2. The information processing device according to claim 1, wherein the determination is made based on information included in the received response.

3. The information processing device according to claim 1, wherein the created virtual device has a function of receiving a print instruction in accordance with the particular protocol, generating a print job based on the print instruction, and transmitting the generated print job to the printer in accordance with a protocol that is different from the particular protocol.

4. The information processing device according to claim 1, wherein controller is configured to:

determine whether the printer that has responded to the printer search request supports a particular protocol; and display information of the printer based on a determination that the printer does not support the particular protocol; and not display information of the printer based on a determination that the printer supports the particular protocol.

5. The information processing device according to claim 4, wherein the created virtual device has a function of receiving a print instruction in accordance with the particular protocol, generating a print job based on the print instruction, and transmitting the generated print job to the printer in accordance with a protocol that is different from the particular protocol.

6. The information processing device according to claim 4, wherein the created virtual device has a function of notifying the operating system of information of the created virtual device.

7. The information processing device according to claim 1, wherein the controller is configured to:

determine whether the printer that has responded to the printer search request supports a particular protocol; and display information of the printer based on a determination that the printer does not support the particular protocol; and not display information of the printer based on a determination that the printer supports the particular protocol.

8. The information processing device according to claim 7, wherein the created virtual device has a function of receiving a print instruction in accordance with the particular protocol, generating a print job based on the print instruction, and transmitting the generated print job to the printer in accordance with a protocol that is different from the particular protocol.

9. The information processing device according to claim 7, wherein the created virtual device has a function of notifying the operating system of information of the created virtual device.

10. A control method of an information processing device, the control method comprising:

issuing a printer search request to search for a printer;

receiving a response to the issued printer search request;

determining whether the response to the printer search request has been received from a printer each or from a virtual printer that causes a printer to print;

displaying, on a display, information of the printer based on a determination that the response to the printer search request has been received from a printer, and not display information of the virtual printer based on a determination that the response to the printer search request has been received from a virtual printer that causes a printer to print; and creating a virtual device configured to cause the printer whose information has been displayed and selected by a user to print and respond to a printer search request.

11. The control method of the information processing device according to claim 10, wherein the determination is made based on information included in the received response.

12. The control method of the information processing device according to claim 10, wherein the created virtual device has a function of receiving a print instruction in accordance with the particular protocol, generating a print job based on the print instruction, and transmitting the generated print job to the printer in accordance with a protocol that is different from the particular protocol.

13. A non-transitory storage medium storing an application, when executed by a computer, the application instructing the computer to:

issue a printer search request to search for a printer;

receive a response to the issued printer search request;

determine whether the response to the printer search request has been received from a printer or from a virtual printer that causes a printer to print;

display, on a display, information of the printer based on a determination that the response to the printer search request has been received from a printer, and not display information of the virtual printer based on a determination that the response to the printer search request has been received from a virtual printer that causes a printer to print; and create a virtual printer configured to cause the printer whose information has been displayed and selected by a user to print and respond to a printer search request.

* * * * *